US012761334B2

(12) United States Patent

Olvera et al.

(10) Patent No.: US 12,761,334 B2
(45) Date of Patent: Oct. 13, 2026

(54) INDEPENDENT ROTATION CONTROL OF SONAR AND TROLLING MOTOR

(71) Applicant: Navico Group Americas, LLC, Menomonee Falls, WI (US)

(72) Inventors: Paul Olvera, Edgewater, FL (US); Matthew Morelly, New Smyrna Beach, FL (US)

(73) Assignee: Navico Group Americas, LLC, Menomonee Falls, WI (US)

( * ) Notice: Subject to any disclaimer, the term of this patent is extended or adjusted under 35 U.S.C. 154(b) by 142 days.

(21) Appl. No.: 18/786,868

(22) Filed: Jul. 29, 2024

(65) Prior Publication Data

US 2026/0029521 A1 Jan. 29, 2026

(51) Int. Cl.

*G01S 7/521* (2006.01)
*B63H 20/00* (2006.01)
*G10K 11/00* (2006.01)

(52) U.S. Cl.

CPC ............ *G01S 7/521* (2013.01); *B63H 20/007* (2013.01); *G10K 11/006* (2013.01)

(58) Field of Classification Search

CPC ...... G01S 7/521; B63H 20/007; G10K 11/006
See application file for complete search history.

(56) References Cited

U.S. PATENT DOCUMENTS 2,877,733 A 3/1959 Harris
3,598,947 A 8/1971 Osborn
3,807,345 A 4/1974 Peterson
4,824,408 A 4/1989 Aertker et al.
4,982,924 A 1/1991 Havins
5,293,351 A 3/1994 Noponen
5,420,828 A 5/1995 Geiger
5,526,765 A 6/1996 Ahearn
5,892,338 A 4/1999 Moore et al.
6,054,831 A 4/2000 Moore et al.
6,181,644 B1 1/2001 Gallagher
6,325,684 B1 12/2001 Knight
6,447,347 B1 9/2002 Steinhauser
6,504,794 B2 1/2003 Haase et al.
(Continued)

OTHER PUBLICATIONS

InDepth Sonar youtube video titled "LiveScope Perspective VS Mega 360—Garmin VS Humminbird" dated Mar. 9, 2020, https://www.youtube.com/watch?v=71Afwdillxs (Year: 2020).*
(Continued)

*Primary Examiner* — Terrell L McKinnon
*Assistant Examiner* — Ding Y Tan
(74) *Attorney, Agent, or Firm* — Nelson Mullins Riley & Scarborough LLP

(57) ABSTRACT

A combined sonar and motor assembly is provided. The combined sonar and motor assembly includes a sonar transducer assembly, a propulsion motor, a subassembly defining an opening therein, and a first shaft defining an axis. The sonar transducer assembly is attached to the subassembly, and the propulsion motor is attached to the shaft. The subassembly is configured to receive the first shaft within the opening so that the first shaft is rotatable relative to the subassembly to enable rotation of one of the sonar transducer assembly or the propulsion motor about the axis without rotating the other. The sonar transducer assembly and the propulsion motor are both configured to rotate about the axis.

17 Claims, 14 Drawing Sheets

(56) References Cited

U.S. PATENT DOCUMENTS

| | | | | |
|---|---|---|---|---|
| 6,507,164 | B1 | 1/2003 | Healey et al. | |
| 6,524,144 | B2 | 2/2003 | Pasley | |
| 6,661,742 | B2 | 12/2003 | Hansen | |
| 6,678,589 | B2 | 1/2004 | Robertson et al. | |
| 6,868,360 | B1 | 3/2005 | Olstad et al. | |
| 6,870,794 | B2 | 3/2005 | Healey | |
| 6,899,574 | B1 | 5/2005 | Kalis et al. | |
| 6,902,446 | B1 | 6/2005 | Healey | |
| 6,909,946 | B1 | 6/2005 | Kabel et al. | |
| 6,919,704 | B1 | 7/2005 | Healey | |
| 7,004,804 | B2 | 2/2006 | Bernloehr et al. | |
| 7,190,636 | B1 | 3/2007 | Depaola | |
| 7,195,526 | B2 | 3/2007 | Bernloehr et al. | |
| 7,268,703 | B1 | 9/2007 | Kabel et al. | |
| 7,303,595 | B1 | 12/2007 | Janitz | |
| 7,369,461 | B2 | 5/2008 | Watanabe et al. | |
| 7,371,218 | B2 | 5/2008 | Walston et al. | |
| 7,430,461 | B1 | 9/2008 | Michaels | |
| 7,452,251 | B2 | 11/2008 | Boebel | |
| 7,538,511 | B2 | 5/2009 | Samek | |
| D594,034 | S | 6/2009 | Bernloehr et al. | |
| 7,542,376 | B1 | 6/2009 | Thompson et al. | |
| 7,633,431 | B1 | 12/2009 | Wey et al. | |
| 7,722,417 | B2 | 5/2010 | Bernloehr et al. | |
| 7,889,600 | B2 | 2/2011 | Thompson et al. | |
| 8,106,617 | B1 | 1/2012 | Holley | |
| 8,195,084 | B2 | 6/2012 | Xiao | |
| 8,221,175 | B2 | 7/2012 | Mynster | |
| 8,300,502 | B2 | 10/2012 | Yockney | |
| 8,305,844 | B2 | 11/2012 | DePasqua | |
| 8,645,012 | B2 | 2/2014 | Salmon et al. | |
| 8,761,976 | B2 | 6/2014 | Salmon et al. | |
| 8,814,129 | B2 | 8/2014 | Todd et al. | |
| 8,879,359 | B2 | 11/2014 | DePasqua | |
| 8,888,065 | B2 | 11/2014 | Logan | |
| 8,896,480 | B1 | 11/2014 | Wilson et al. | |
| 8,991,280 | B2 | 3/2015 | Wireman | |
| 9,127,707 | B1 | 9/2015 | Huntley | |
| 9,132,900 | B2 | 9/2015 | Salmon et al. | |
| 9,135,731 | B2 | 9/2015 | Lauenstein et al. | |
| 9,160,210 | B2 | 10/2015 | Perry | |
| 9,162,743 | B1 | 10/2015 | Grace et al. | |
| 9,201,142 | B2 | 12/2015 | Antao | |
| 9,278,745 | B2 | 3/2016 | Kooi, Jr. et al. | |
| 9,290,256 | B1 | 3/2016 | Wireman et al. | |
| 9,296,455 | B2 | 3/2016 | Bernloehr et al. | |
| 9,322,915 | B2 | 4/2016 | Betts et al. | |
| 9,354,311 | B2 | 5/2016 | Chen et al. | |
| 9,394,040 | B2 | 7/2016 | Grace et al. | |
| 9,459,350 | B2 | 10/2016 | Betts et al. | |
| 9,459,356 | B2 | 10/2016 | Lee et al. | |
| 9,505,477 | B2 | 11/2016 | Grace et al. | |
| 9,507,562 | B2 | 11/2016 | Bailey | |
| 9,594,375 | B2 | 3/2017 | Jopling | |
| 9,596,839 | B2 | 3/2017 | Bailey | |
| 9,664,783 | B2 | 5/2017 | Brown et al. | |
| 9,676,462 | B2 | 6/2017 | Bernloehr et al. | |
| 9,746,874 | B2 | 8/2017 | Johnson et al. | |
| 9,758,222 | B2 | 9/2017 | Grace et al. | |
| 9,766,328 | B2 | 9/2017 | Black et al. | |
| 9,784,825 | B2 | 10/2017 | Brown et al. | |
| 9,784,826 | B2 | 10/2017 | Matson et al. | |
| 9,812,118 | B2 | 11/2017 | Matson et al. | |
| 9,836,129 | B2 | 12/2017 | Clark | |
| 9,947,309 | B2 | 4/2018 | Stokes et al. | |
| 10,012,731 | B2 | 7/2018 | Pelin et al. | |
| 10,025,312 | B2 | 7/2018 | Langford-Wood | |
| 10,061,025 | B2 | 8/2018 | Kirmani | |
| 10,107,908 | B2 | 10/2018 | Betts et al. | |
| 10,114,119 | B2 | 10/2018 | Horner et al. | |
| 10,114,470 | B2 | 10/2018 | Clark | |
| 10,203,403 | B2 | 2/2019 | Fabrizio et al. | |
| 10,241,200 | B2 | 3/2019 | Sayer et al. | |
| 10,247,823 | B2 | 4/2019 | Brown et al. | |
| 10,281,576 | B2 | 5/2019 | DePasqua | |

| | | | | |
|---|---|---|---|---|
| 10,310,062 | B2 | 6/2019 | Coleman et al. | |
| 10,311,715 | B2 | 6/2019 | Jopling | |
| 10,324,175 | B2 | 6/2019 | Laster | |
| 10,325,582 | B2 | 6/2019 | Antao et al. | |
| 10,451,732 | B2 | 10/2019 | Laster | |
| 10,460,484 | B2 | 10/2019 | Hovland et al. | |
| 10,514,451 | B2 | 12/2019 | Brown et al. | |
| 10,545,226 | B2 | 1/2020 | Wigh et al. | |
| 10,545,235 | B2 | 1/2020 | Pelin et al. | |
| 10,684,368 | B2 | 6/2020 | Pelin et al. | |
| 10,723,428 | B1 | 7/2020 | Vicari et al. | |
| 10,890,660 | B2 | 1/2021 | Wigh et al. | |
| 11,046,408 | B1 * | 6/2021 | Crawford | B63B 34/05 |
| 11,059,556 | B2 | 7/2021 | Ahlgren | |
| 11,061,136 | B2 | 7/2021 | Abbas et al. | |
| 11,204,416 | B2 | 12/2021 | Matson et al. | |
| 11,217,216 | B2 | 1/2022 | Vance | |
| 11,370,516 | B2 * | 6/2022 | Ridl | B63H 20/12 |
| 11,525,907 | B2 | 12/2022 | Wigh et al. | |
| 11,536,820 | B2 | 12/2022 | Wigh et al. | |
| 11,548,603 | B2 | 1/2023 | Crawford et al. | |
| 11,598,871 | B2 | 3/2023 | Stokes | |
| 11,694,667 | B2 | 7/2023 | Vance | |
| 11,733,699 | B2 | 8/2023 | Johnson et al. | |
| 11,760,457 | B2 | 9/2023 | Pendergraft | |
| 11,762,090 | B2 | 9/2023 | Simonton | |
| 11,880,002 | B1 * | 1/2024 | Helms, III | G01S 7/521 |
| 11,971,478 | B2 | 4/2024 | Combs et al. | |
| 12,314,050 | B1 * | 5/2025 | Clark | G01S 19/40 |
| 12,372,649 | B2 * | 7/2025 | Roath | F16M 11/06 |
| 2003/0191562 | A1 | 10/2003 | Robertson et al. | |
| 2003/0203684 | A1 | 10/2003 | Healey | |
| 2003/0214483 | A1 | 11/2003 | Hammer et al. | |
| 2003/0214880 | A1 | 11/2003 | Rowe | |
| 2005/0255761 | A1 | 11/2005 | Bernloehr et al. | |
| 2006/0116031 | A1 | 6/2006 | Bernloehr et al. | |
| 2009/0037040 | A1 | 2/2009 | Salmon et al. | |
| 2009/0227158 | A1 | 9/2009 | Bernloehr et al. | |
| 2010/0014386 | A1 | 1/2010 | Thompson et al. | |
| 2012/0014220 | A1 | 1/2012 | DePasqua | |
| 2012/0015566 | A1 | 1/2012 | Salmon | |
| 2012/0060733 | A1 | 3/2012 | Maki et al. | |
| 2012/0204467 | A1 | 8/2012 | Palmer et al. | |
| 2012/0232719 | A1 | 9/2012 | Salmon et al. | |
| 2012/0299764 | A1 | 11/2012 | Haneda et al. | |
| 2013/0044569 | A1 | 2/2013 | DePasqua | |
| 2013/0215719 | A1 * | 8/2013 | Betts | G01S 15/89 367/88 |
| 2014/0092709 | A1 * | 4/2014 | Miller | G01S 7/521 367/87 |
| 2014/0203162 | A1 | 7/2014 | Logan | |
| 2014/0249698 | A1 | 9/2014 | Salmon et al. | |
| 2014/0269164 | A1 | 9/2014 | Betts et al. | |
| 2014/0269192 | A1 | 9/2014 | Proctor | |
| 2014/0277851 | A1 | 9/2014 | Grace et al. | |
| 2014/0336854 | A1 | 11/2014 | Salmon et al. | |
| 2015/0016130 | A1 | 1/2015 | Davis et al. | |
| 2015/0063059 | A1 | 3/2015 | DePasqua | |
| 2015/0063060 | A1 | 3/2015 | DePasqua | |
| 2015/0151824 | A1 | 6/2015 | Wireman | |
| 2015/0298782 | A1 * | 10/2015 | Bernloehr | B63H 20/007 440/6 |
| 2015/0346729 | A1 | 12/2015 | Grace et al. | |
| 2016/0016651 | A1 | 1/2016 | Anderson et al. | |
| 2016/0253150 | A1 | 9/2016 | Williams et al. | |
| 2017/0038460 | A1 | 2/2017 | Clark | |
| 2017/0285167 | A1 | 10/2017 | Proctor et al. | |
| 2017/0371039 | A1 | 12/2017 | Clark et al. | |
| 2018/0120431 | A1 * | 5/2018 | Pelin | G01S 7/6263 |
| 2018/0244361 | A1 | 8/2018 | Laster | |
| 2018/0288990 | A1 | 10/2018 | Laster et al. | |
| 2018/0329056 | A1 | 11/2018 | Smith et al. | |
| 2018/0365246 | A1 | 12/2018 | Laster et al. | |
| 2019/0064348 | A1 | 2/2019 | Clark et al. | |
| 2019/0072951 | A1 | 3/2019 | Clark et al. | |
| 2019/0088239 | A1 | 3/2019 | Antao et al. | |
| 2019/0176952 | A1 | 6/2019 | Clark et al. | |
| 2019/0176953 | A1 | 6/2019 | Clark et al. | |
| 2019/0219692 | A1 | 7/2019 | DePasqua | |

(56) References Cited

U.S. PATENT DOCUMENTS

| | | | | |
|---|---|---|---|---|
| 2019/0265354 | A1 | 8/2019 | Antao et al. | |
| 2019/0331779 | A1 | 10/2019 | Sandretto | |
| 2020/0070943 | A1 | 3/2020 | Clark et al. | |
| 2020/0072953 | A1 | 3/2020 | Wigh et al. | |
| 2020/0103512 | A1 | 4/2020 | Brown et al. | |
| 2020/0256967 | A1 | 8/2020 | Wigh et al. | |
| 2020/0271782 | A1 | 8/2020 | Rolt et al. | |
| 2020/0272152 | A1 | 8/2020 | Combs | |
| 2020/0401143 | A1 | 12/2020 | Johnson et al. | |
| 2021/0037107 | A1 | 2/2021 | Klenk et al. | |
| 2021/0056944 | A1* | 2/2021 | Vance | G10K 11/004 |
| 2021/0096244 | A1 | 4/2021 | Wigh et al. | |
| 2021/0096245 | A1 | 4/2021 | Kozuki et al. | |
| 2021/0141086 | A1 | 5/2021 | Sloss et al. | |
| 2021/0255627 | A1 | 8/2021 | Snyder et al. | |
| 2021/0278514 | A1* | 9/2021 | Hughes | G01S 7/521 |
| 2021/0284310 | A1* | 9/2021 | Crawford | B63B 34/05 |
| 2021/0371074 | A1 | 12/2021 | Lammers-Meis | |
| 2022/0018958 | A1* | 1/2022 | Wagner | A01K 79/00 |
| 2022/0108677 | A1 | 4/2022 | Vance | |
| 2022/0120882 | A1 | 4/2022 | Coleman et al. | |
| 2022/0268926 | A1* | 8/2022 | Hooper | G01S 7/56 |
| 2022/0373662 | A1* | 11/2022 | Crawford | G01S 15/86 |
| 2022/0373663 | A1* | 11/2022 | Caspall | B63B 45/08 |
| 2022/0381891 | A1 | 12/2022 | Ruland et al. | |
| 2022/0381906 | A1 | 12/2022 | Combs et al. | |
| 2022/0390542 | A1* | 12/2022 | Clark | H04N 1/00411 |
| 2023/0011068 | A1* | 1/2023 | Pendergraft | G05D 1/0206 |
| 2023/0047381 | A1 | 2/2023 | Vance | |
| 2023/0088987 | A1 | 3/2023 | Brown et al. | |
| 2023/0238924 | A1 | 7/2023 | Kondo | |
| 2023/0251375 | A1 | 8/2023 | Wigh et al. | |
| 2023/0314582 | A1 | 10/2023 | Eliason | |
| 2023/0358885 | A1* | 11/2023 | Laster | G01S 15/74 |
| 2024/0125928 | A1* | 4/2024 | Roath | F16M 11/06 |
| 2024/0159899 | A1 | 5/2024 | Roller | |
| 2025/0012910 | A1* | 1/2025 | Bird, Jr. | G10K 11/352 |
| 2025/0014556 | A1* | 1/2025 | Bird, Jr. | G10K 11/006 |
| 2025/0123383 | A1* | 4/2025 | Reetz | G01S 7/6281 |

OTHER PUBLICATIONS

Humminbird 2023 accessory resource guide dated Jan. 1, 2023 (Year: 2023).*

“Revolution Sonar PB1 Motion Demo with Trolling Motor Sync Mode;” *Revolution Sonar*, Dec. 15, 2023; retrieved Sep. 17, 2025 from https://www.youtube.com/watch?v=uAG8F85QqLk.

“Revolution Sonar—Sonar Aiming Systems;” *BBC Boards*; Jul. 27, 2023; retrieved Sep. 17, 2025 from https://www.bbcboards.net/showthread.php?t=1232824&s=c5a42dc4lea26479a478c23d0aa9b575.

“Sonar Explained;” *Deep Trekker Inc.*; Jan. 24, 2022; retrieved Sep. 17, 2025 from https://www.bing.com/videos/riverview/relatedvideo?q=youtube+revolution+sonar&refig=68a5cb784562432291668396021 9b2c3&pc=U531&ru=%2fsearch%3fq%3dyoutube%2brevolution%2bsonar%26form%3dANNH01%26refig%3d68a5cb78456243229166839602 19b2c3%26pc%3dU531&mmscn=vwrc&mid=2D0CB87D7AFBB3FC6F362D0CB87D7AFBB3FC6F36&FORM=WRVORC&ntb=1&msockid=7ec984ee7dd611f0b382146ff37b0751&ajaxhist-0.

* cited by examiner

INDEPENDENT ROTATION CONTROL OF SONAR AND TROLLING MOTOR

FIELD

Embodiments relate generally to combined assemblies that are attachable to a watercraft and that comprise a sonar transducer assembly and a propulsion motor that are independently rotatable relative to each other.

BACKGROUND

Sonar transducer assemblies are typically mounted on the same shaft as the trolling motor or they are mounted on their own individual shaft. Either setup has its own problems or drawbacks.

In a system where the sonar transducer assembly is fixed to the same shaft as the trolling motor, the sonar transducer assembly is typically not capable of being rotated independently relative to the trolling motor. However, this presents a problem because fish, structures, or other desirable targets may be in a position that is different from the direction of the trolling motor. Additionally, wind and water current may cause the watercraft to change course, necessitating an adjustment at the trolling motor that may cause the sonar transducer assembly to be directed away from its target. Thus, with this setup, the user often has to decide whether the user wants to maneuver the boat or whether the user wants to find fish. In some instances, the user may only utilize the sonar transducer assembly as desired when the trolling motor is not actively being used.

In a system where the sonar transducer assembly is mounted on a different shaft than the trolling motor, the user is forced to find valuable deck space to mount two different shafts that extend into the water. This requires separate mounting systems for the sonar transducer assembly and the trolling motor, increasing the cost of these systems and increasing the difficulty of assembly for these systems. Additionally, including separate mounting systems for the sonar transducer assembly and the trolling motor may require deck space to store the systems associated with the sonar transducer assembly and the trolling motor when the systems are not deployed into the water. Furthermore, including separate mounting systems for the sonar transducer assembly and the trolling motor typically forces the user into using two different remotes, with one remote being used to adjust operation of the sonar transducer assembly and with the other being used to adjust the operation of the trolling motor. Operating a remote for the trolling motor, another remote for the sonar, a fishing rod, a multifunction display, and/or other devices all within a moment's notice often becomes difficult. By imposing more work on the user, the user has less time to devote to other tasks.

BRIEF SUMMARY

In various embodiments described herein, a sonar transducer assembly and a propulsion motor may effectively be provided in a combined assembly where the sonar transducer assembly and the propulsion motor may rotate independently relative to each other. In some embodiments, the depth of the sonar transducer assembly and the propulsion motor may be adjustable relative to each other as well.

A combined assembly may be attached to a watercraft at a single mounting location rather than requiring a first assembly associated with the sonar transducer assembly to be mounted to a watercraft via a shaft at a first location and a second assembly associated with the propulsion motor to be mounted to a watercraft via another shaft at a second location. The combined assembly may effectively take up about the same amount of deck space that a single trolling motor would usually occupy in some embodiments.

A single remote may be used in some embodiments to control the operation of the sonar transducer assembly and the propulsion motor. The remote may be configured to switch between different modes, and the remote may be configured to adjust the position and/or the orientation of the propulsion motor in one mode and to adjust the position and/or the orientation of the sonar transducer assembly in another mode. Directional buttons may be provided that allow a user to position and orient the propulsion motor and the sonar transducer assembly as desired. By providing a single remote, the operator has less remotes to keep up with and may have more time to devote to other tasks.

In some embodiments, the combined assembly may include one or more shafts and/or a subassembly. The combined assembly may provide the appearance of a single shaft or mast, but the combined assembly may actually be comprised of a subassembly and a shaft that may rotate independently of one another. The propulsion motor may be attached to the end of one shaft, allowing the shaft to handle the necessary torque loads associated with the thrust delivered by a propulsion motor. The sonar transducer assembly may be mounted on the subassembly (which, in some embodiments, may simply be another shaft) defining an internal opening therein, and the subassembly may be configured to receive the trolling motor shaft within the internal opening so that the two shafts may rotate independently relative to each other along the same axis. However, in some embodiments, the sonar transducer assembly may be mounted to some other type of subassembly, and the subassembly may be independently rotatable relative to the trolling motor shaft.

In an example embodiment, a combined sonar and motor assembly is provided. The combined sonar and motor assembly includes a sonar transducer assembly, a propulsion motor, a subassembly defining an opening therein, and a first shaft defining an axis. The sonar transducer assembly is attached to the subassembly, and the propulsion motor is attached to the shaft. The subassembly is configured to receive the first shaft within the opening so that the first shaft is rotatable relative to the subassembly to enable rotation of one of the sonar transducer assembly or the propulsion motor about the axis without rotating the other. The sonar transducer assembly and the propulsion motor are both configured to rotate about the axis.

In some embodiments, the subassembly may include a second shaft, and the second shaft may be hollow and may define an opening. The first shaft may be received within the opening of the second shaft, and the first shaft may be configured to rotate relative to the second shaft. The sonar transducer assembly may be attached on the second shaft, and the first shaft and the second shaft may be rotatable relative to each other to enable rotation of one of the sonar transducer assembly or the propulsion motor about the axis without rotating the other. Additionally, in some embodiments, the first shaft may be configured to slide within the opening of the second shaft to increase or decrease a distance between the sonar transducer assembly and the propulsion motor. Furthermore, in some embodiments, the combined sonar and motor assembly may include a depth adjustment knob that is configured to adjust a depth of at least one of the sonar transducer assembly or the propulsion motor.

In some embodiments, the propulsion motor may be a trolling motor.

In some embodiments, the combined sonar and motor assembly may also include a gear motor, a motor shaft having a first end and a second end, and a first gear. The first end of the motor shaft may be attached to the gear motor, and the second end of the motor shaft may be attached to or may be configured to engage with the first gear. Activation of the gear motor may cause rotation of the motor shaft and the first gear, and rotation of the first gear may cause rotation of the first shaft or the subassembly. Additionally, in some embodiments, the first gear may engage with a portion of the first shaft or the subassembly. Furthermore, in some embodiments, the combined sonar and motor assembly may also include a second gear that engages with a portion of the first shaft or the subassembly, the first gear may engage with the second gear, and rotation of the first gear may cause rotation of the first shaft or the subassembly due to engagement between the first gear and the second gear. Also, in some embodiments, the first gear may rotate about a first axis, the second gear may rotate about a second axis, and the first axis and the second axis may be positioned so that they are not parallel to each other. In some embodiments, the first gear may rotate about a first axis, the second gear may rotate about a second axis, and the first axis and the second axis may be positioned so that they are about perpendicular to each other.

In some embodiments, an orientation of at least one of the sonar transducer assembly or the propulsion motor may be manually adjustable. Additionally, in some embodiments, the combined sonar and motor assembly may include a handle. The subassembly may also include a second shaft, and the second shaft may be hollow and may define an opening. The first shaft may be received within the opening of the second shaft, and the first shaft may be configured to rotate relative to the second shaft. The sonar transducer assembly may be attached on the second shaft, and the first shaft may be manually rotatable relative to the second shaft to enable rotation of the sonar transducer assembly about the axis using the handle without rotating the propulsion motor.

In some embodiments, the combined sonar and motor assembly may also include a handle and a third shaft. The third shaft may be attached to the watercraft, and the third shaft may be hollow and may define a third shaft opening. The second shaft may be received within the third shaft opening, and the second shaft may be configured to rotate relative to the third shaft. The handle may be attached to the first shaft or the second shaft, and the handle may be configured to be manually rotated to cause the second shaft to rotate relative to the first shaft to enable rotation of the sonar transducer assembly about the axis using the handle without rotating the propulsion motor.

In another example embodiment, a combined sonar and motor assembly is provided. The combined sonar and motor assembly includes a sonar transducer assembly, a propulsion motor, a first shaft defining an axis, and a second shaft that is hollow and that defines an opening. The first shaft is received within the opening of the second shaft. The propulsion motor is attached on the first shaft, and the sonar transducer assembly is attached on the second shaft. The second shaft is configured to rotate relative to the first shaft about the axis to enable a rotation of one of the sonar transducer assembly or the propulsion motor about the axis without rotating the other, and the sonar transducer assembly and the propulsion motor are both configured to rotate about the axis.

In some embodiments, the second shaft may be configured to be attached to a body of the watercraft, and the first shaft may not be directly attached to the body of the watercraft. In some embodiments, the first shaft may be received within the opening of the second shaft, and the first shaft may be configured to rotate relative to the second shaft. Additionally, in some embodiments, the first shaft may be configured to slide within the opening of the second shaft to increase or decrease a distance between the sonar transducer assembly and the propulsion motor.

In an example embodiment, a method of assembling a combined sonar and motor assembly for a watercraft is provided. The method includes providing a first shaft that defines an axis, with the first shaft defining a first end and a second end. The method also includes providing sonar transducer assembly, a propulsion motor, and a subassembly that defines an opening therein. The method also includes attaching the sonar transducer assembly to the subassembly, attaching the propulsion motor to the first shaft proximate to the second end of the first shaft, and receiving the first end of the first shaft through the opening of the subassembly. The first end of the first shaft is received through the opening of the subassembly so that the first shaft is allowed to rotate about the axis and so that the sonar transducer assembly is rotatable about the axis relative to the propulsion motor.

In some embodiments, the first end of the first shaft may be received in the opening of the subassembly so that the first shaft is allowed to move along the axis relative to the subassembly and so that the distance between the sonar transducer assembly and the propulsion motor is adjustable. In some embodiments, the subassembly may include a second shaft that is hollow and that defines the opening of the subassembly therein.

BRIEF DESCRIPTION OF THE DRAWINGS

Reference will now be made to the accompanying drawings, which are not necessarily drawn to scale, and wherein.

DETAILED DESCRIPTION

Figure 1:
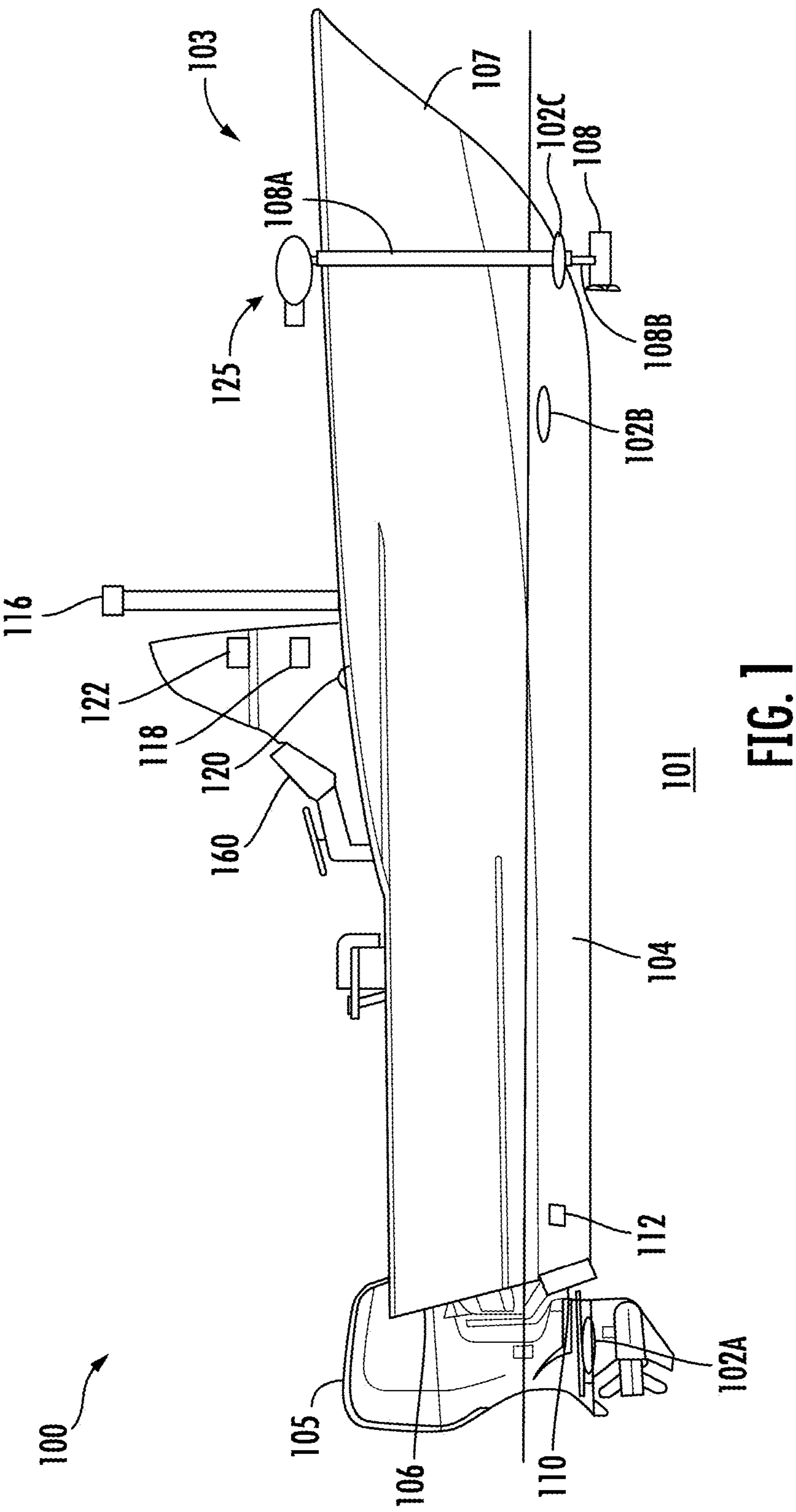
FIG. 1 is a schematic view illustrating an example watercraft including various marine devices, in accordance with some embodiments discussed herein.

Example embodiments now will be described more fully hereinafter with reference to the accompanying drawings, in which some, but not all embodiments are shown. Like reference numerals generally refer to like elements throughout. For example, reference numbers 125, 225, 325, 425 each refer to different embodiments of a combined assembly. Additionally, any connections or attachments may be direct or indirect connections or attachments unless specifically noted otherwise.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102A, 102B, 102C disposed on and/or proximate to the watercraft 100. Notably, example watercraft contemplated herein may be surface watercraft, submersible watercraft, or any other implementation known to those skilled in the art. The sonar transducer assemblies 102A-102C may each include one or more sonar transducer elements (such as in the form of the example assemblies described herein) configured to transmit sound waves into a body of water, receive sonar returns from the body of water, and convert the sonar returns into sonar return data. Various types of sonar transducers may be provided—for example, a linear downscan sonar transducer element, a conical downscan sonar transducer element, a sonar transducer array (such as for a live sonar transducer assembly), multiple sonar transducer arrays (such as for a live sonar transducer assembly), or a sidescan sonar transducer element may be used. A forward facing sonar transducer assembly may be used in various embodiments described herein. Each of the sonar transducer assemblies 102A-102C are configured to provide sonar data that may be stored and that may undergo further processing to form sonar images. The sonar data may include information representative of an underwater environment around a watercraft.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more sonar transducer assemblies (e.g., 102A-102C) may be mounted in various positions and to various portions of the watercraft 100 and/or equipment associated with the watercraft 100. For example, the sonar transducer assembly may be mounted proximate to the transom 106 of the watercraft 100, such as depicted by sonar transducer assembly 102A. The sonar transducer assembly may be mounted to the bottom or side of the hull 104 of the watercraft 100, such as depicted by sonar transducer assembly 102B. The sonar transducer assembly may also be mounted to the trolling motor 108, such as depicted by sonar transducer assembly 102C.

The watercraft 100 also includes a combined assembly 125. This combined assembly 125 comprises a subassembly in the form of a shaft 108A, and the combined assembly 125 also comprises a shaft 108B. A sonar transducer assembly 102C is positioned at the bottom end of the shaft 108A, and a trolling motor 108 is positioned at the bottom end of the shaft 108B. The shaft 108A may be hollow and may define an opening, and the shaft 108A may be configured to receive the shaft 108B within the opening. This configuration may enable the shaft 108B to extend or retract within the opening in a telescoping manner, which may allow the relative vertical positioning or depth of the trolling motor 108 and/or the sonar transducer assembly 102C to be adjusted relative to the watercraft 100. This configuration may also enable the shaft 108B to be rotated independently relative to the shaft 108A, which may allow the relative orientation of the trolling motor 108 and/or the sonar transducer assembly 102C to be adjusted relative to the watercraft 100. This combined assembly 125 is described in further detail herein.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other locations on the watercraft 100 are contemplated. Additionally or alternatively, a remote device (such as a mobile device of a user) may include functionality of a marine electronic device.

The watercraft 100 may also comprise other components within the one or more marine electronic devices 160 or at the helm. In FIG. 1, the watercraft 100 comprises a radar 116, which is mounted at an elevated position (although other positions relative to the watercraft 100 are also contemplated). The watercraft 100 also comprises an AIS transceiver 118, a direction sensor 120, and a camera 122, and these components are each positioned at or near the helm (although other positions relative to the watercraft 100 are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more marine electronic devices 160 or other devices. Another example device on the watercraft 100 includes a temperature sensor 112 that may be positioned so that the temperature sensor 112 rests within or outside of the body of water 101. Other example devices include a wind sensor, one or more speakers, and various vessel devices/features (e.g., doors, bilge pump, fuel tank, etc.), among other things. Additionally, one or more sensors may be associated with marine devices. For example, a sensor may be provided to detect the position of the primary motor 105, the trolling motor 108, or the rudder 110. The watercraft 100 includes a bow 103 at the front end of the watercraft 100, and the watercraft 100 includes a keel 107, which may extend along a centerline of the watercraft 100 and generally along the forward direction of the watercraft 100.

Figure 2:
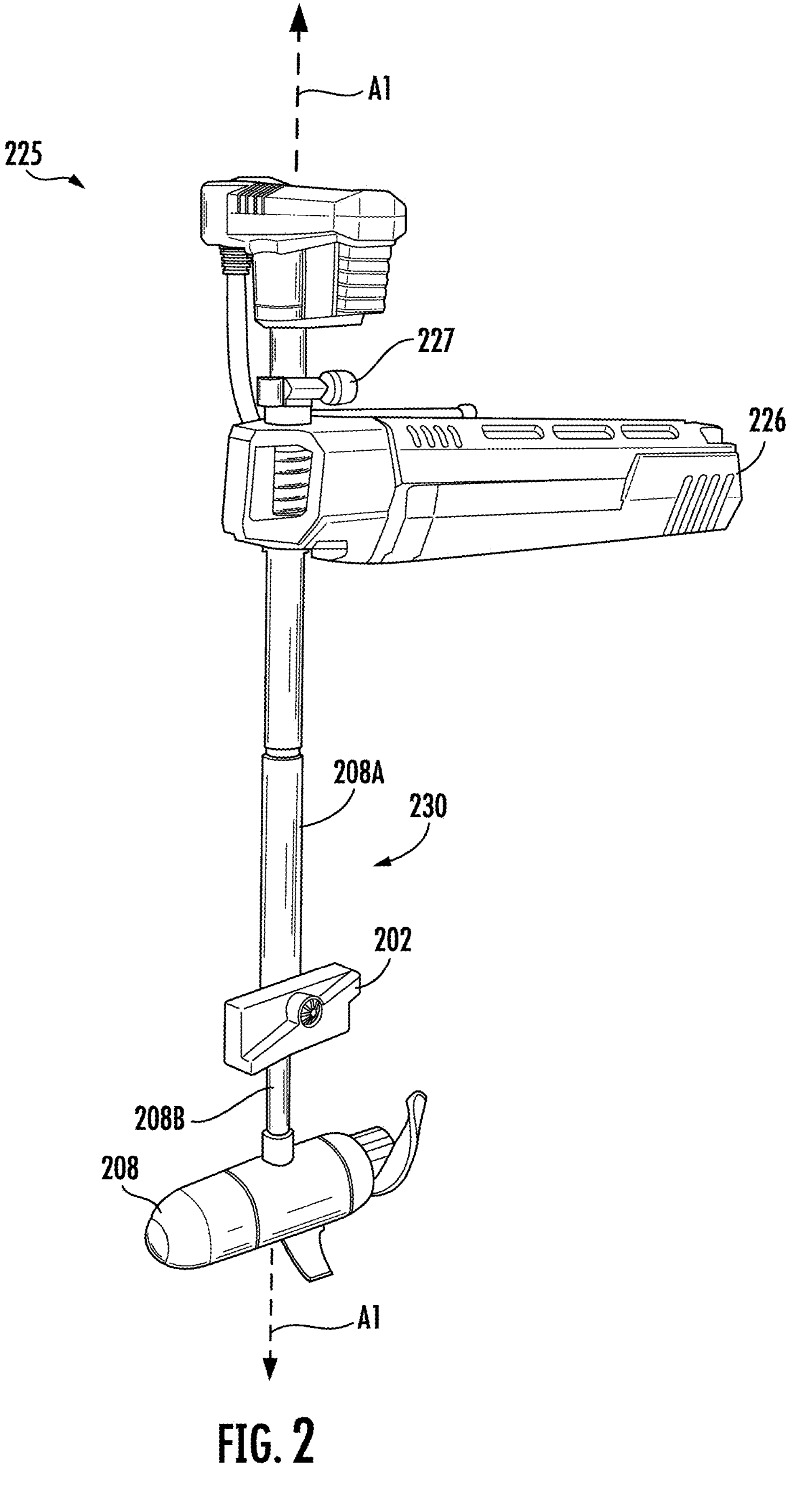
FIG. 2 is a perspective view illustrating an example combined assembly having a sonar transducer assembly and a motor, in accordance with some embodiments discussed herein.

FIG. 2 is a perspective view illustrating an example combined assembly 225 having a sonar transducer assembly 202 and a propulsion motor 208. The combined assembly 225 may be attached to a watercraft at a single mounting location. In the embodiment illustrated in FIG. 2, the propulsion motor 208 is a trolling motor. However, other propulsion motors may be used instead of a trolling motor such as a primary motor, a kicker motor, etc. The combined assembly 225 also includes a subassembly 230 including a shaft 208A, and the combined assembly 225 also includes a shaft 208B. The shaft 208A includes a first end and a second end, with the first end elevated above the second end. Similarly, the shaft 208B includes a first end and a second end, with the first end elevated above the second end. The shaft 208A is hollow and defines an internal opening therein, and the shaft 208A is configured to receive the first end of the shaft 208B within the internal opening of the shaft 208A.

Each of these shafts 208A, 208B may extend in a lengthwise direction that is parallel or colinear with the axis A1. The sonar transducer assembly 202 is attached to the shaft 208A proximate to the second end of the shaft 208A, and the sonar transducer assembly 202 may form part of the subassembly 230. The propulsion motor 208 is attached to the shaft 208B proximate to the second end of the shaft 208B. The attachment of the sonar transducer assembly 202 to the shaft 208A and the attachment of the propulsion motor 208 to the shaft 208B may enable the propulsion motor 208 and the sonar transducer assembly 202 to be rotated independently of each other. For example, the shaft 208B is configured to rotate about the axis A1 relative to the shaft 208A, thereby allowing the propulsion motor 208 to be rotated about the axis A1 relative to the sonar transducer assembly 202. Additionally, the shaft 208A may be configured to rotate about the axis A1 relative to the shaft 208B, thereby allowing the sonar transducer assembly 202 to be rotated about the axis A1 relative to the propulsion motor 208. The shaft 208A may be attached to the body of the watercraft either directly or indirectly. In some embodiments, the ability to independently rotate the shaft 208A and the shaft 208B may enable only one of the sonar transducer assembly 202 or the propulsion motor 208 to be rotated about the axis A1 while the other remains stationary.

In some embodiments, the shaft 208B may be configured to slide within the opening of the shaft 208A. This may allow the distance between the sonar transducer assembly 202 and the propulsion motor 208 to be increased or decreased, which may effectively change the depth of the sonar transducer assembly 202 or the propulsion motor 208.

The combined assembly 225 also includes a steering actuator 226 and a depth adjustment knob 227. The depth adjustment knob 227 may be configured to adjust a depth of the sonar transducer assembly 202 and/or the propulsion motor 208.

Figure 3:
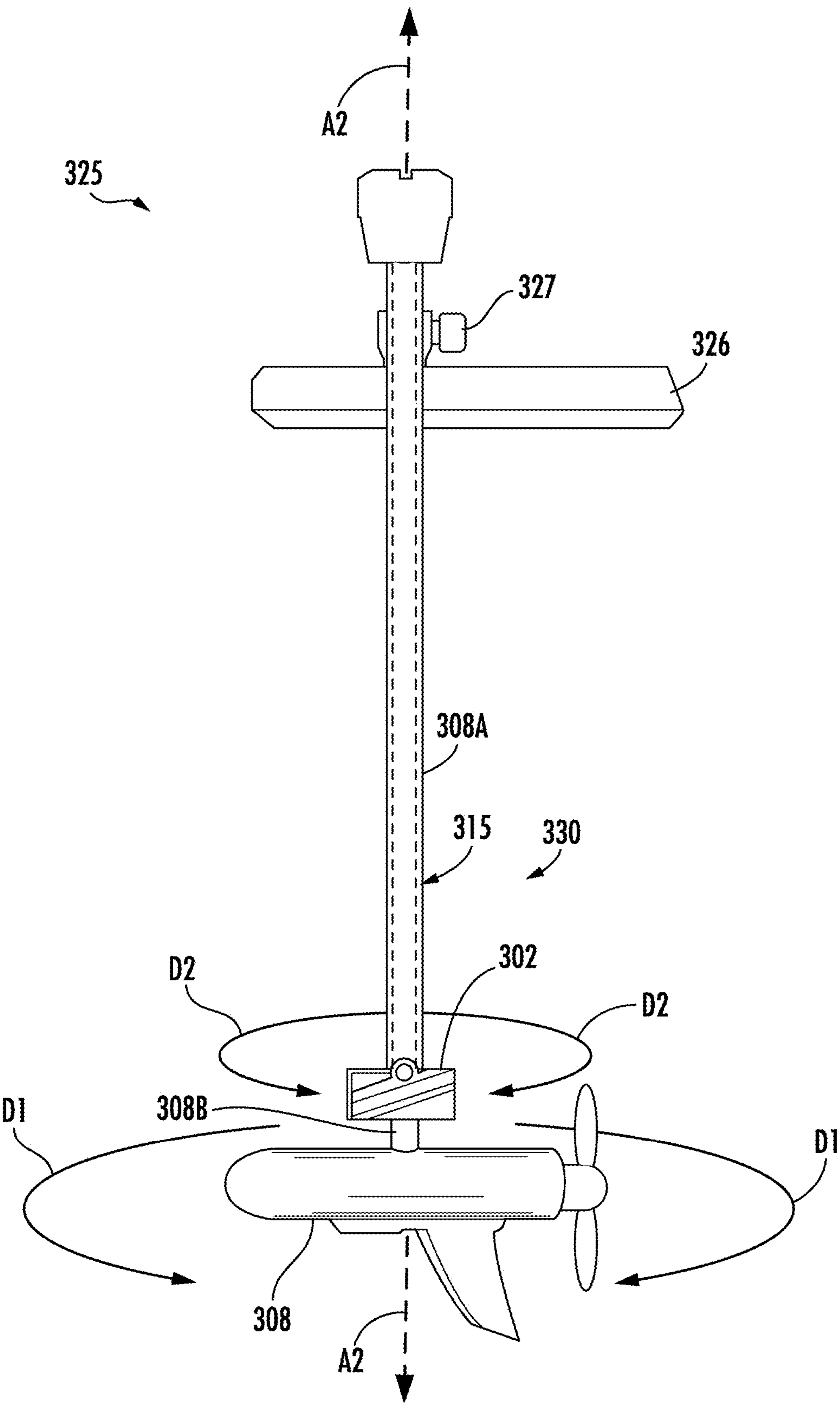
FIG. 3 is a schematic view illustrating an example combined assembly having a sonar transducer assembly attached to a first shaft and a propulsion motor attached to a second shaft, with the combined assembly being configured to enable rotation of the sonar transducer assembly and the propulsion motor relative to each other by rotating one of the first shaft or the second shaft without rotating the other, in accordance with some embodiments discussed herein.

FIG. 3 is a schematic view illustrating an example combined assembly 325 having a sonar transducer assembly 302 and a propulsion motor 308, with this combined assembly 325 being configured to enable rotation of the sonar transducer assembly 302 and the propulsion motor 308 relative to each other. The propulsion motor 308 is a trolling motor. The combined assembly 325 includes a subassembly 330 including a shaft 308A, and the combined assembly 325 also includes a shaft 308B. The sonar transducer assembly 302 is attached to the shaft 308A, and the sonar transducer assembly 302 may form part of the subassembly 330. The propulsion motor 308 is attached to the shaft 308B. The shaft 308A and the shaft 308B are configured to be rotated relative to each other such that the propulsion motor 308 and the sonar transducer assembly 302 may be rotated relative to each other. For example, the shaft 308A may be rotated about the axis A2 relative to the shaft 308B to cause the sonar transducer assembly 302 to rotate as indicated by the arrows D2, and this may be done while the shaft 308B and the propulsion motor 308 remain stationary. Alternatively, the shaft 308B may be rotated about the axis A2 relative to the shaft 308A to cause the propulsion motor 308 to rotate as indicated by the arrows D1, and this may be done while the shaft 308A and the sonar transducer assembly 302 remain stationary. In some embodiments, the sonar transducer assembly 302 and the propulsion motor 308 may be rotated a full 360 degrees around the axis A2.

The shaft 308A is hollow and defines an internal opening 315. The shaft 308B is received within the opening 315 of the shaft 308A. With the shaft 308B received in the opening 315, the shaft 308B may be configured to rotate relative to the shaft 308A. In some embodiments, the shaft 308B may be configured to slide within the opening 315 of the shaft 308A, thereby increasing or decreasing the distance between the sonar transducer assembly 302 and the propulsion motor 308. Additionally, the shaft 308B may slide within the opening 315 of the shaft 308A so that the depth of the propulsion motor 308 and the overall length of the combined assembly 325 may be adjusted.

The combined assembly 325 also includes a depth adjustment knob 327. The depth adjustment knob 327 is configured to adjust a depth of the sonar transducer assembly 302 and/or the propulsion motor 308. In the embodiment illustrated in FIG. 3, the depth adjustment knob 327 may control the positioning of the shaft 308A relative to the shaft 308B. The depth adjustment knob 327 is attached to the shaft 308A. The depth adjustment knob 327 may be tightened so that it engages the shaft 308B extending within the opening 315, which may eventually constrain the shaft 308B and fix the position of the shaft 308B relative to the shaft 308A. Alternatively, the depth adjustment knob 327 may be loosened so that the depth adjustment knob 327 does not engage the shaft 308B to the point that the depth adjustment knob 327 restricts movement of the shaft 308B relative to the shaft 308A. In this unlocked state, the position of the shaft 308B may be adjusted relative to the shaft 308A. While the depth adjustment knob 327 is used to adjust the depth of the sonar transducer assembly 302 and the position of the shaft 308B, the depth adjustment knob 327 may be used to adjust the depth of the propulsion motor 308 in other embodiments.

The steering actuator 326 may be configured to actuate to cause rotation of the shaft 308A and/or the shaft 308B about the axis A2. To cause rotation, the steering actuator 326 may directly rotate the shaft 308A or the shaft 308B. Alternatively, a series of cam shafts or gears may be employed to cause rotation of the shafts 308A, 308B. The steering actuator 326 may be controlled via signals transmitted to the steering actuator 326 from a navigation control device via a wired or wireless connection.

Figure 4:
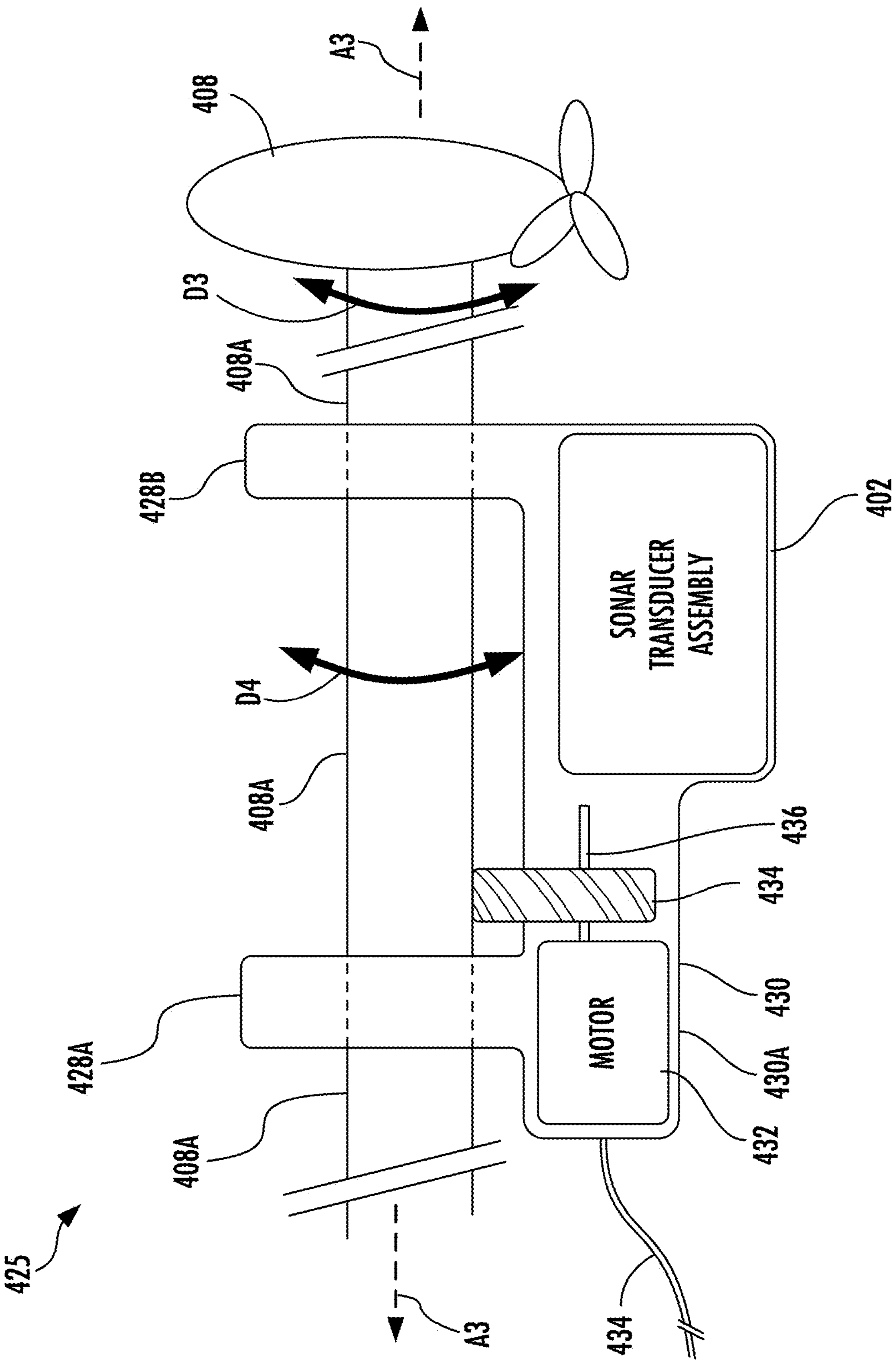
FIG. 4 is a schematic view illustrating an example combined assembly having a sonar transducer assembly and a propulsion motor, with the sonar transducer assembly being positioned on a subassembly and with the combined assembly being configured to enable rotation of the sonar transducer assembly and the propulsion motor relative to each other through the use of a gear that engages directly with a shaft, in accordance with some embodiments discussed herein.

An example combined assembly 425 having a sonar transducer assembly 402 and a propulsion motor 408 is illustrated in the schematic view of FIG. 4. The combined assembly 425 is configured to enable rotation of the sonar transducer assembly 402 and the propulsion motor 408 relative to each other.

In the combined assembly 425, the sonar transducer assembly 402 is included in a subassembly 430, and the subassembly 430 is rotatable relative to the shaft 408A. The sonar transducer assembly 402 is attached to a member 430A within the subassembly 430. Additionally, a motor 432, a motor shaft 436, and a gear 434 are provided in the combined assembly 425, with each of these included as part of the subassembly 430. The motor 432, the motor shaft 436, and the gear 434 may be attached directly or indirectly to the member 430A. A first sleeve 428A and a second sleeve 428B are also included in the subassembly 430, with these sleeves 428A, 428B being attached to the member 430A. The sleeves 428A, 428B may generally define a circular shape with an opening therein, and the sleeves 428A, 428B may be configured to receive the shaft 408A within the openings of the sleeves 428A, 428B. The sleeves 428A, 428B may also have bearings within the sleeves 428A, 428B.

The motor shaft 436 includes a first end and a second end. The first end of the motor shaft 436 is attached to the motor 432. The second end of the motor shaft 436 is received in the gear 434. The gear 434 may engage with a portion of the shaft 408A. In some embodiments, the portion of the shaft 408A configured to engage with the gear 434 may include teeth that are configured to engage with teeth of the gear 434, but grip tape or some other features may be provided at this portion of the shaft 408A in other embodiments to assist with engagement with the gear 434 in other embodiments. Activation of the motor 432 may cause rotation of the motor shaft 436 and the gear 434. Rotation of the gear 434 may cause rotation of the member 430A and other components of the subassembly 430 relative to the shaft 408A. Thus, rotation of the gear 434 may enable rotation of the sonar transducer assembly 402 about the axis A3 relative to the propulsion motor 408 as indicated by the arrows D4. However, in other embodiments, the shaft 408A may be rotated relative to the subassembly 430 so that the propulsion motor 408 may be rotated as indicated by the arrows D3. In some embodiments, when the propulsion motor 408 is rotated in a first rotational direction, the subassembly 430 may be rotated by an equal but opposite amount in opposing rotational direction to maintain the sonar transducer assembly 402 at a particular angle.

Figure 5:
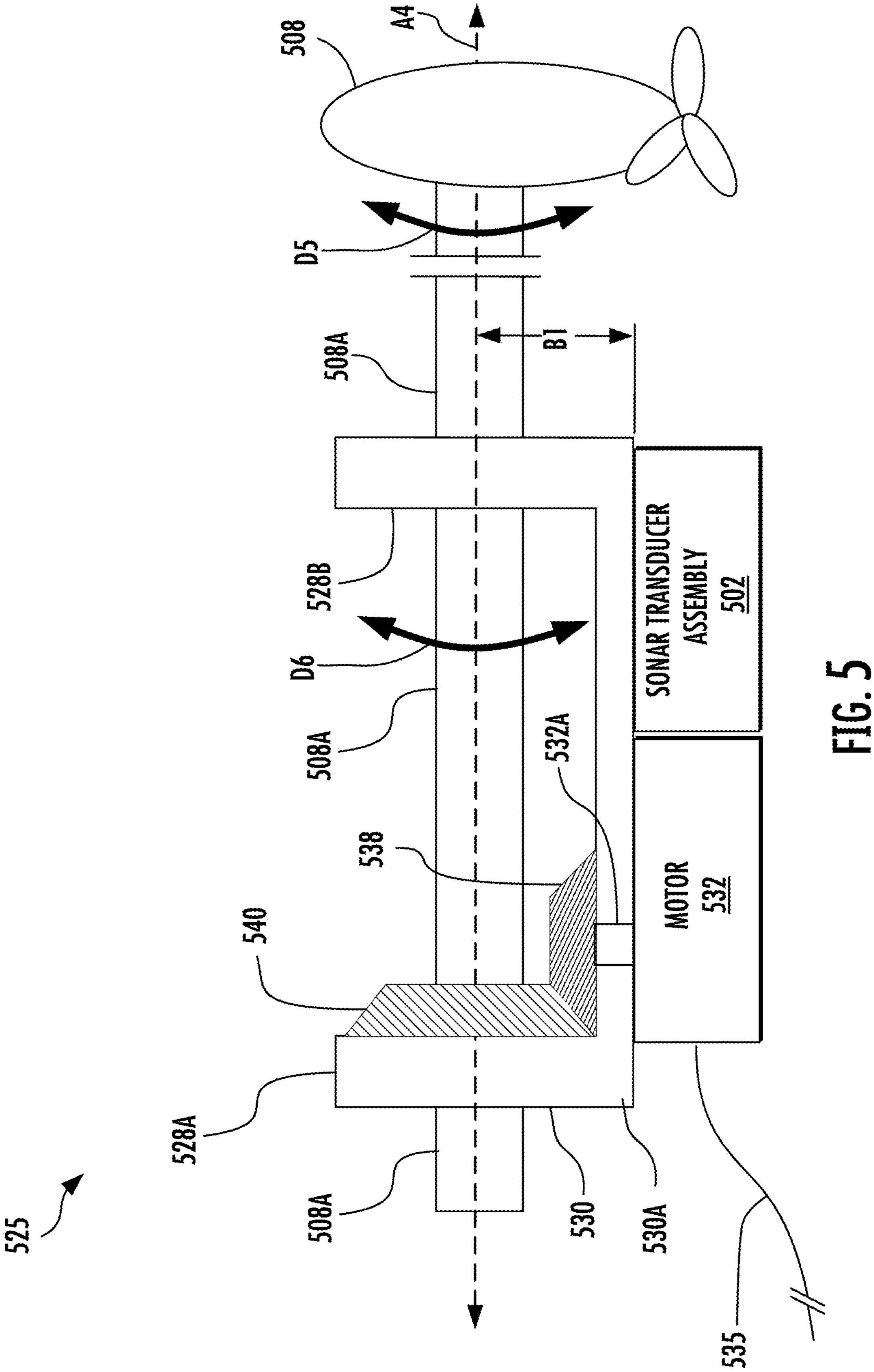
FIG. 5 is a schematic view illustrating an example combined assembly having a sonar transducer assembly and a propulsion motor, with the sonar transducer assembly being positioned on a subassembly and with the combined assembly being configured to enable rotation of the sonar transducer assembly and the propulsion motor relative to each other through the use of multiple gears that are configured to rotate about axes that are perpendicular to each other, in accordance with some embodiments discussed herein.

FIG. 5 is a schematic view illustrating an example combined assembly 525 having a sonar transducer assembly 502 and a propulsion motor 508, with this combined assembly 525 being configured to enable rotation of the sonar transducer assembly 502 and the propulsion motor 508 relative to each other. For example, the propulsion motor 508 may be rotated relative to the subassembly 530 and the sonar transducer assembly 502 as indicated by the arrows D5, and the subassembly 530 and the sonar transducer assembly 502 may be rotated relative to the propulsion motor 508 as indicated by the arrows D6. The combined assembly 525 includes a shaft 508A, a propulsion motor 508, and a subassembly 530 including a sonar transducer assembly 502. Similar to other embodiments, the shaft 508A may define an axis A4, and the propulsion motor 508 is positioned at the end of the shaft 508A. The propulsion motor 508 is a trolling motor, but the propulsion motor 508 may be some other type of propulsion motor in other embodiments.

The subassembly 530 includes a member 530A, a first sleeve 528A, and a second sleeve 528B. The first sleeve 528A and the second sleeve 528B are attached to the member 530A. In some embodiments, the sleeves 528A, 528B may be integrally attached to the member 530A, but the sleeves 528A, 528B and the member 530A may be provided as separate components that are configured to be attached together in other embodiments.

The sleeves 528A, 528B may define a circular shape with openings therein, and the sleeves 528A, 528B may be configured to receive the shaft 508A within the openings of the sleeves 528A, 528B. The sleeves 528A, 528B may also have bearings within the sleeves 528A, 528B. The shaft 508A may be received within the openings of the sleeves 528A, 528B so that the shaft 508A and the subassembly 530 are rotatable relative to each other, thereby allowing the propulsion motor 508 and the sonar transducer assembly 502 to be rotated relative to each other. In some embodiments, the shaft 508A may be received within the openings of the sleeves 528A, 528B so that the shaft 508A is allowed to slide relative to the sleeves 528A, 528B and the subassembly 530. While two sleeves 528A, 528B are included in the embodiments illustrated in FIG. 5, a different number of sleeves may be utilized in other embodiments (e.g., 1 sleeve, 3 or more sleeves, etc.). In some embodiments, a sleeve may only partially envelop the shaft 508A without wrapping all the way around the shaft 508A.

The sonar transducer assembly 502 is attached to the member 530A within the subassembly 530. The sonar transducer assembly 502 may be attached to the member 530A so that the sonar transducer assembly 502 is separated from the axis A4 by a distance B1. The distance B1 may be between about 2 centimeters and about 50 centimeters in some embodiments. However, this distance B1 may possess different values in other embodiments. Additionally, a motor 532, a motor shaft 532A, and a gear 538 are provided in the combined assembly 525, with each of these included as part of the subassembly 530. The motor 532 may be attached directly or indirectly to the member 530A.

The motor shaft 532A includes a first end and a second end. A first end of the motor shaft 532A is attached to the motor 532, and a second end of the motor shaft 532A is attached to or is configured to engage with the gear 538. The gear 538 engages with the gear 540, and the gear 540 engages with the shaft 508A. Activation of the motor 532 may cause rotation of the motor shaft 532A, which may cause rotation of the gear 538, which may cause rotation of the gear 540, which may cause rotation of the subassembly 530 relative to the shaft 508A. The gear 538 rotates about an axis that extends vertically in FIG. 5 and perpendicularly relative to the axis A4. The gear 540 rotates about an axis that extends horizontally in FIG. 6 and that extends in a parallel direction relative to the axis A4. Thus, the axis of rotation for the gear 538 is not parallel to the axis of rotation for the gear 540. These axes are instead about perpendicular to each other.

One or more cables 535 may connect the subassembly 530 to other components. For example, the cable(s) 535 may be connected to the motor 532 and/or the sonar transducer assembly 502 to provide power to these components, the cable(s) 535 may allow for the transfer of data, and the cable(s) 535 may be used for other purposes.

Figure 6:
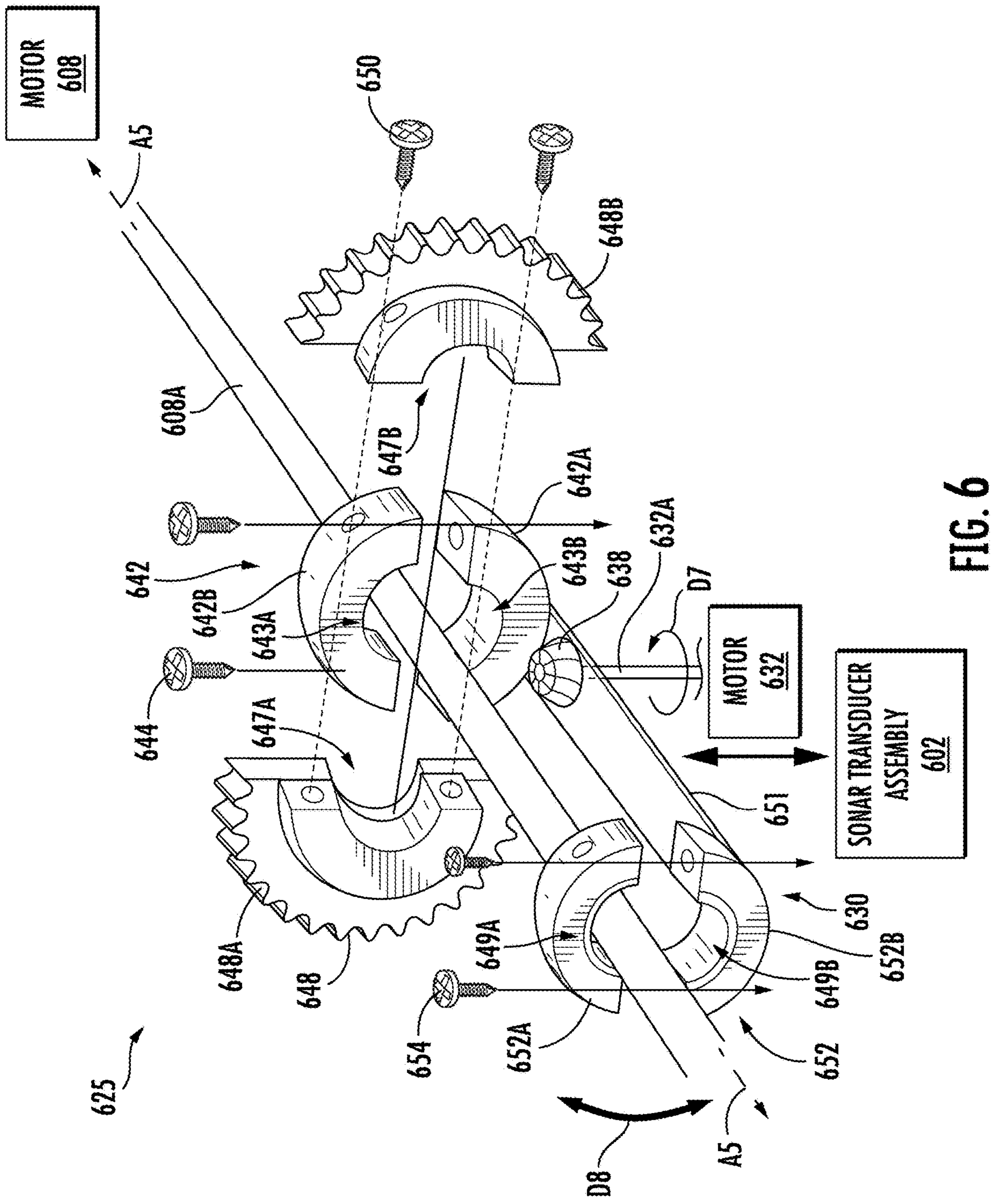
FIG. 6 is a schematic view illustrating an example combined assembly having a sonar transducer assembly and a propulsion motor, with the sonar transducer assembly being positioned on a subassembly and with the combined assembly being configured to enable rotation of the sonar transducer assembly and the propulsion motor relative to each other through the use of multiple gears that are configured to rotate about axes that are perpendicular to each other, in accordance with some embodiments discussed herein.

Another example combined assembly 625 having a sonar transducer assembly 602 and a propulsion motor 608 is illustrated in the schematic view of FIG. 6. The combined assembly 625 is configured to enable rotation of the sonar transducer assembly 602 and the propulsion motor 608 relative to each other. The combined assembly 625 deploys split sleeves and split screws to facilitate rotation of a sonar transducer assembly 602 relative to a propulsion motor 608.

In the combined assembly 625, a subassembly 630 is provided. The subassembly 630 may include a sonar transducer assembly 602, and the sonar transducer assembly 602 may be attached to the member 651. The member 651 may attach a first sleeve 642 and a second sleeve 652. The first sleeve 642 and the second sleeve 652 may both be split power bearings in some embodiments.

The first sleeve 642 includes a first portion 642A and a second portion 642B. The first portion 642A and the second portion 642B may be attached together using fasteners 644. The first portion 642A defines a first opening 643A and the second portion 642B defines a second opening 643B. When the first portion 642A and the second portion 642B are attached together, the first opening 643A and the second opening 643B may be positioned adjacent to each other, and the shaft 608A may be received within the openings 643A, 643B. The shaft 608A may be received within the openings 643A, 643B so that the shaft 608A is allowed to freely rotate relative to the first sleeve 642. Additionally, the shaft 608A may be received within the openings 643A, 643B so that the shaft 608A is allowed to extend or retract along the axis A5 to allow the depth of the propulsion motor 608 to be adjusted relative to the sonar transducer assembly 602 or vice versa.

The second sleeve 652 includes a first portion 652A and a second portion 652B. The first portion 652A and the second portion 652B may be attached together using fasteners 654. The first portion 652A defines a first opening 649A and the second portion 652B defines a second opening 649B. When the first portion 652A and the second portion 652B are attached together, the first opening 649A and the second opening 649B may be positioned adjacent to each other, and the shaft 608A may be received within the openings 649A, 649B. The shaft 608A may be received within the openings 649A, 649B so that the shaft 608A is allowed to freely rotate relative to the second sleeve 652. Additionally, the shaft 608A may be received within the openings 649A, 649B so that the shaft 608A is allowed to extend or retract along the axis A5 to allow the depth of the propulsion motor 608 to be adjusted relative to the sonar transducer assembly 602 or vice versa.

The subassembly 630 includes a motor 632, a motor shaft 632A, and a gear 638. The motor 632 may be attached to the member 651. The motor shaft 632A includes a first end and a second end. The first end of the motor shaft 632A is attached to the motor 632. The second end of the motor shaft 632A is attached to the gear 638.

The subassembly 630 also includes a split gear 648, with the split gear 648 including a first portion 648A and a second portion 648B. The first portion 648A and the second portion 648B may be attached together using fasteners 650. The first portion 648A defines a first opening 647A and the second portion 648B defines a second opening 647B. When the first portion 648A and the second portion 648B are attached together, the first opening 647A and the second opening 647B may be positioned adjacent to each other, and the shaft 608A may be received within the openings 647A, 647B. The first portion 648A and second portion 648B may be attached to the shaft 608A such that the portions 648A, 648B are rotationally fixed to the shaft 608A. Similar to other embodiments, the shaft 608A may define an axis A5, and the propulsion motor 608 is positioned at the end of the shaft 608A.

Activation of the motor 632 may cause rotation of the motor shaft 632A as indicated by the arrows D7, and rotation of the motor shaft 632A may cause rotation of the gear 638. The gear 638 may be configured to engage the split gear 648 once the split gear 648 is assembled and attached to the shaft 608A. Thus, rotation of the gear 638 may cause the split gear 648 to rotate, thereby causing rotation of the subassembly 630 relative to the shaft 608A because the shaft 608A is rotationally fixed relative to the split gear 648. Subassembly 630 may rotate relative to the shaft 608A as indicated by the arrows D8. Thus, activation of the motor 632 may cause rotation of the sonar transducer assembly 602 relative to the propulsion motor 608. When the shaft 608A is being rotated to cause independent rotation of the propulsion motor 608, the gears 638, 648 may be separated from each other so that they do not engage each other in some embodiments.

The gear 638 rotates about an axis that extends vertically from the perspective illustrated in FIG. 6 and that extends perpendicularly relative to the axis A5. The gear 648 rotates about an axis that extends in a parallel direction relative to the axis A5. Thus, the axis of rotation for the gear 638 is not parallel to the axis of rotation for the gear 648, and these axes are instead approximately perpendicular to each other.

Similar to other embodiments, the shaft 608A may define an axis A5, and the propulsion motor 608 is positioned at the end of the shaft 608A. The propulsion motor 608 is a trolling motor, but the propulsion motor 608 may be some other type of propulsion motor in other embodiments.

Figure 7:
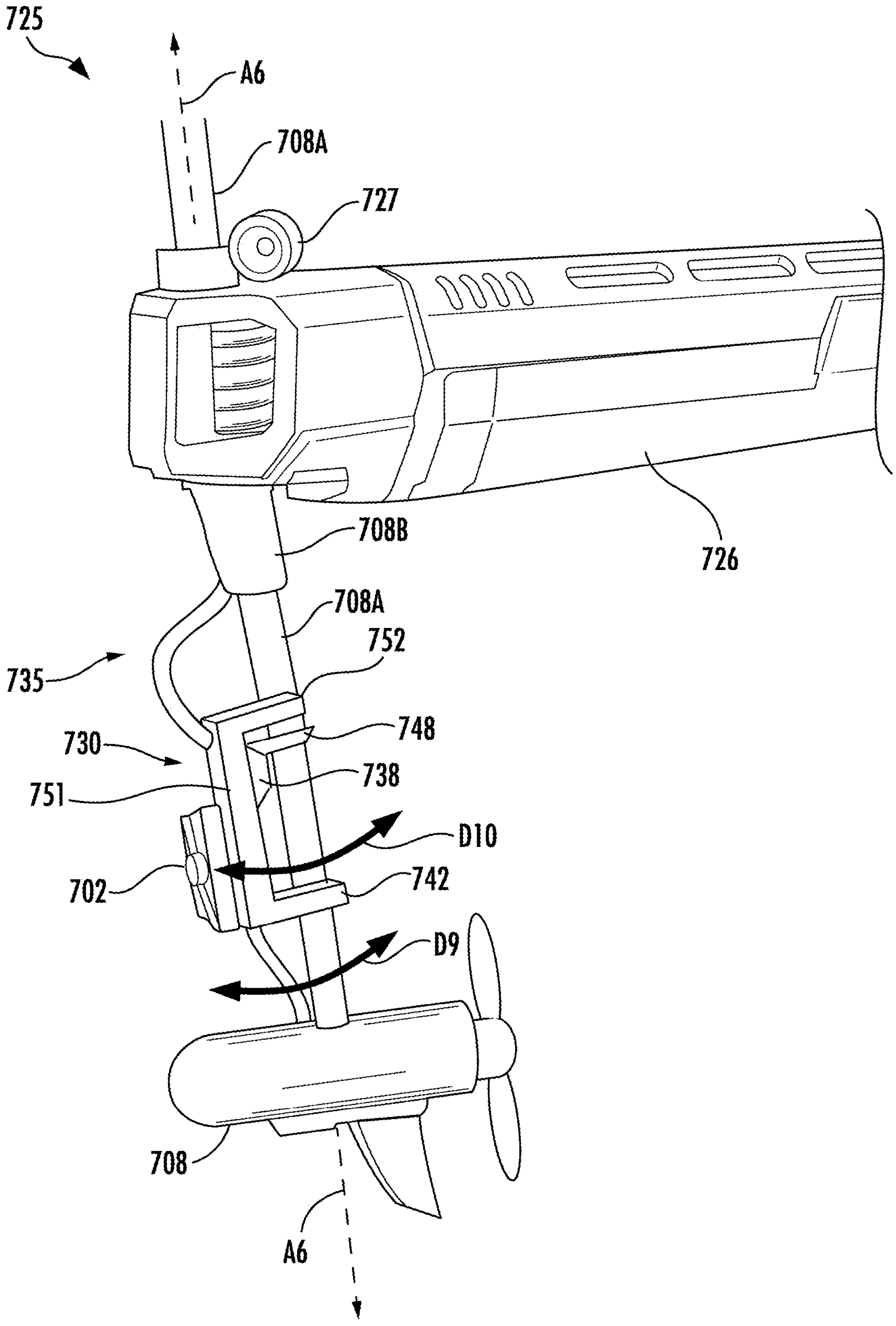
FIG. 7 is a schematic view illustrating an example combined assembly having a sonar transducer assembly and a propulsion motor, with the sonar transducer assembly being positioned on a subassembly and with the combined assembly being configured to enable rotation of the sonar transducer assembly and the propulsion motor relative to each other through the use of multiple gears that are configured to rotate about axes that are perpendicular to each other, in accordance with some embodiments discussed herein.

Another example combined assembly 725 having a sonar transducer assembly 702 and a propulsion motor 708 is illustrated in the schematic view of FIG. 7. The combined assembly 725 is configured to enable rotation of the sonar transducer assembly 702 and the propulsion motor 708 relative to each other.

In the combined assembly 725, a subassembly 730 is provided. The subassembly 730 may include a sonar transducer assembly 702, and the sonar transducer assembly 702 may be attached to the member 751. The member 751 may be attached to a first sleeve 742 and a second sleeve 752. The first sleeve 742 and the second sleeve 752 may both be split power bearings in some embodiments. The member 751, the first sleeve 742, and the second sleeve 752 may each form part of the subassembly 730.

In some embodiments, the first sleeve 742 may include multiple portions that are attachable together like the portions 642A, 642B of the first sleeve 642 in FIG. 6. However, in other embodiments, the first sleeve 742 may include only one unitary structure. The first sleeve 742 defines an opening, and the opening may be configured to receive the shaft 708A therein. The shaft 708A may be received within the opening so that the shaft 708A is allowed to freely rotate relative to the first sleeve 742. Additionally, the shaft 708A may be received within the opening so that the shaft 708A is allowed to extend or retract along the axis A6 to allow the depth of the propulsion motor 708 to be adjusted relative to the sonar transducer assembly 702.

In some embodiments, the second sleeve 752 may include multiple portions that are attachable together like the portions 652A, 652B of the second sleeve 652 in FIG. 6. However, in other embodiments, the second sleeve 752 may include only one unitary structure. The second sleeve 752 defines an opening, and the opening may be configured to receive the shaft 708A therein. The shaft 708A may be received within the opening so that the shaft 708A is allowed to freely rotate relative to the second sleeve 752. Additionally, the shaft 708A may be received within the opening so that the shaft 708A is allowed to extend or retract along the axis A6 to allow the depth of the propulsion motor 708 to be adjusted relative to the sonar transducer assembly 702.

In addition to the member 751, the sleeves 742, 752, and the sonar transducer assembly 702, the subassembly 730 may also include a motor (not shown), a motor shaft (not shown), a gear 738, a gear 748, and one or more cables 735. The motor shaft is attached to the motor on one end, and another end of the motor shaft is attached to the gear 738. The gear 738 may be configured to engage the gear 748 once the gear 748 is assembled and attached to the shaft 708A. The gear 748 may be a split gear similar to the split gear 648 of FIG. 6. The shaft 708A may be received within the opening defined by the gear 748. The gear 748 may be attached to the shaft 708A such that the gear 748 is rotationally fixed to the shaft 708A. Similar to other embodiments, the shaft 708A may define an axis A6, and the propulsion motor 708 is positioned at the end of the shaft 708A.

One or more cables 735 may connect the subassembly 730 to other components. For example, the cable(s) 735 may be connected to the sonar transducer assembly 702 and/or to the motor of the subassembly 730 to provide power to these components, the cable(s) 735 may allow for the transfer of data, and the cable(s) 735 may be used for other purposes. In some embodiments, the motor used to power the motor shaft to generate rotation of the gear 738 may be positioned at a remote location relative to the subassembly 730.

Activation of the motor within the subassembly 730 may cause rotation of the motor shaft, and rotation of the motor shaft may cause rotation of the gear 738. Rotation of the gear 738 may cause the gear 748 to rotate, thereby causing rotation of the subassembly 730 relative to the shaft 708A because the shaft 708A is rotationally fixed relative to the gear 748. Subassembly 730 may rotate relative to the shaft 708A as indicated by the arrows D10. Thus, activation of the motor within the subassembly 730 may cause rotation of the sonar transducer assembly 702 relative to the propulsion motor 708. Alternatively, the shaft 708A may be rotated about the axis A6 to cause rotation of the propulsion motor 708 about the axis A6 without causing similar rotation of the sonar transducer assembly 702 as indicated by the arrows D9.

The gear 738 rotates about an axis that generally extends horizontally from the perspective shown in FIG. 7 and perpendicularly relative to the axis A6. By contrast, the gear 740 rotates about an axis that extends in a parallel direction relative to the axis A6. Thus, the axis of rotation for the gear 738 is not parallel to the axis of rotation for the gear 740, and these axes are instead approximately perpendicular to each other.

Similar to other embodiments, the shaft 708A may define an axis A6, and the propulsion motor 708 is positioned at the end of the shaft 708A. The propulsion motor 708 is a trolling motor, but the propulsion motor 708 may be some other type of propulsion motor in other embodiments.

The combined assembly 725 also includes a depth adjustment knob 727. The depth adjustment knob 727 is configured to adjust a depth of the sonar transducer assembly 702 and the propulsion motor 708. In the embodiment illustrated in FIG. 7, the depth adjustment knob 727 may control the positioning of the shaft 708A relative to the shaft 708B. The depth adjustment knob 727 is attached to the shaft 708B. The depth adjustment knob 727 may be tightened so that the depth adjustment knob 727 engages the shaft 708A extending within the opening 715, which may eventually constrain the shaft 708A and fix the position of the shaft 708A relative to the shaft 708B. Alternatively, the depth adjustment knob 727 may be loosened so that the depth adjustment knob 727 does not engage the shaft 708A to the point that the depth adjustment knob 727 restricts movement of the shaft 708A relative to the shaft 708B. In this unlocked state, the position of the shaft 708A may be adjusted relative to the shaft 708B. The depth adjustment knob 727 may be used to adjust a depth of both the sonar transducer assembly 702 and the propulsion motor 708 relative to the watercraft. However, in other embodiments, the depth adjustment knob 727 may be configured to adjust only the depth of the sonar transducer assembly 702 or the propulsion motor 708.

The shaft 708B is hollow and defines an opening therein, and the shaft 708B is configured to receive the shaft 708A within the opening. The shaft 708A may be received within the shaft 708B such that the shaft 708A is rotatable relative to the shaft 708B, and the shaft 708A may be received within the shaft 708B such that shaft 708A is allowed to slide relative to the shaft 708B.

The steering actuator 726 may be configured to actuate to cause rotation of the shaft 708A and/or the shaft 708B. To cause rotation, the steering actuator 726 may directly rotate the shaft 708A or the shaft 708B. Alternatively, a series of cam shafts or gears may be employed to cause rotation of the shafts 708A, 708B. The steering actuator 726 may be controlled via signals transmitted to the steering actuator 726 from a navigation control device via a wired or wireless connection.

Figure 8:
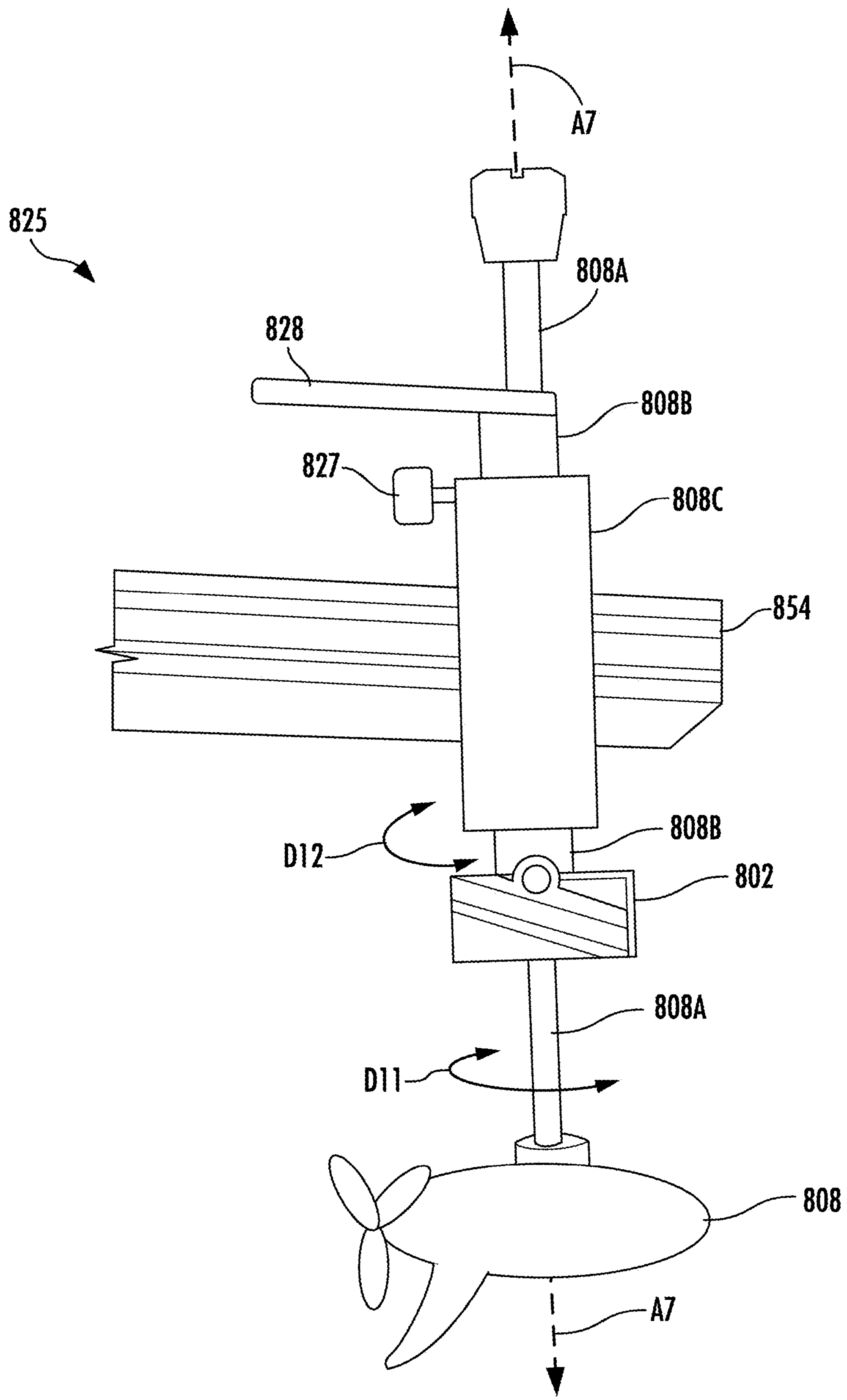
FIG. 8 is a schematic view illustrating an example combined assembly having a sonar transducer assembly and a propulsion motor, with the combined assembly being configured to enable rotation of the sonar transducer assembly and the propulsion motor relative to each other and with the combined assembly having two shafts received within an opening of a third shaft, in accordance with some embodiments discussed herein.

An example combined assembly 825 having a sonar transducer assembly 802 and a propulsion motor 808 is illustrated in the schematic view of FIG. 8, with this combined assembly 825 being configured to enable rotation of the sonar transducer assembly 802 and the propulsion motor 808 relative to each other. In FIG. 8, the shaft 808C is attached to the watercraft 854, and the shaft 808C defines a hollow shape with an opening therein. The shaft 808C is configured to receive the shaft 808B within the opening of the shaft 808C. The shaft 808B defines a hollow shape with an opening therein. The shaft 808B is configured to receive the shaft 808A within the opening of the shaft 808B.

Each of the shafts 808A, 808B, 808C extend lengthwise along the axis A7, and the shafts 808A, 808B may be rotatable relative to the shaft 808C about the axis A7. A sonar transducer assembly 802 is attached at an end of the shaft 808B, and a propulsion motor 808 is attached at an end of the shaft 808A. Rotation of the shaft 808B may therefore cause rotation of the sonar transducer assembly 802 as indicated by the arrows D12, and rotation of the shaft 808A may cause rotation of the propulsion motor 808 as indicated by the arrows D11.

The depth adjustment knob 827 is provided on the shaft 808C. The depth adjustment knob 827 may be tightened so that the depth adjustment knob 827 engages the shaft 808B extending within the opening 815, which may eventually constrain the shaft 808B and fix the position of the shaft 808B relative to the shaft 808C. Alternatively, the depth adjustment knob 827 may be loosened so that the depth adjustment knob 827 does not engage the shaft 808B to the point that the depth adjustment knob 827 restricts movement of the shaft 808B relative to the shaft 808C. In this unlocked state, the position of the shaft 808B may be adjusted relative to the shaft 808C. While the depth adjustment knob 827 is used to adjust the depth of the sonar transducer assembly 802 and the position of the shaft 808B, the depth adjustment knob 827 may be used to adjust the depth of the propulsion motor 808 in other embodiments. For example, in some embodiments, the depth adjustment knob 827 may be configured to engage the shaft 808A instead of or in addition to the shaft 808B.

In FIG. 8, the orientation of sonar transducer assembly 802 is manually adjustable. A handle 828 is attached to the shaft 808B on a first end of the shaft 808B, and the sonar transducer assembly 802 is attached to a second end of the shaft 808B. Rotation of the handle 828 may cause rotation of the shaft 808B and the sonar transducer assembly 802 relative to the axis A7, and this rotation may occur without causing rotation of the propulsion motor 808. In other embodiments, the orientation of the propulsion motor 808 may be manually adjustable using a handle 828. In some embodiments, two separate handles may be used to independently control the orientation of the sonar transducer assembly 802 and the propulsion motor 808. The propulsion motor 808 is a trolling motor, but the propulsion motor 808 may be some other type of propulsion motor in other embodiments.

Figure 9:
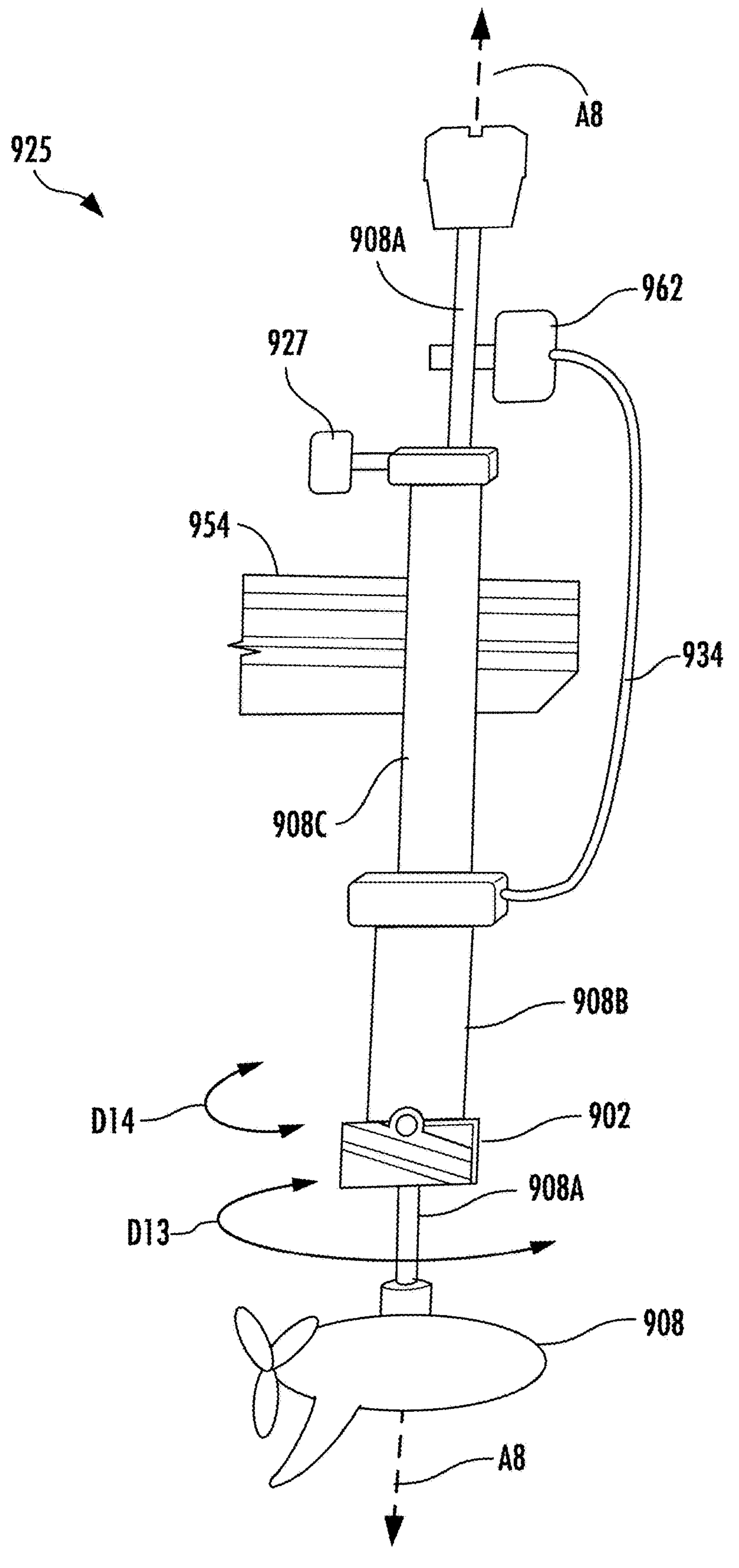
FIG. 9 is a schematic view illustrating an example combined assembly having a sonar transducer assembly and a propulsion motor, with the combined assembly being configured to enable rotation of the sonar transducer assembly and the propulsion motor relative to each other and with the combined assembly having two shafts received within an opening of a third shaft, in accordance with some embodiments discussed herein.

Another example combined assembly 925 is illustrated in the schematic view of FIG. 9, with the combined assembly 925 having a sonar transducer assembly 902 and a propulsion motor 908. The combined assembly 925 is configured to enable rotation of the sonar transducer assembly 902 and the propulsion motor 908 relative to each other.

In FIG. 9, the shaft 908B defines a hollow shape with an opening therein. The shaft 908B is configured to receive the shaft 908C within the opening of the shaft 908B, and the shaft 908C may be attached to the watercraft 954 with the assistance of other attachment devices. The shaft 908C also defines a hollow shape with an opening therein, and the shaft 908C is configured to receive the shaft 908A within the opening of the shaft 908C.

Each of the shafts 908A, 908B, 908C extend lengthwise along the axis A8, and the shafts 908A, 908B may be rotatable relative to the shaft 908C about the axis A8. A sonar transducer assembly 902 is attached at an end of the shaft 908B, and a propulsion motor 908 is attached at an end of the shaft 908A. Rotation of the shaft 908B may therefore cause rotation of the sonar transducer assembly 902 as indicated by the arrows D14, and rotation of the shaft 908A may cause rotation of the propulsion motor 908 as indicated by the arrows D13.

The depth adjustment knob 927 is provided on the shaft 908C. The depth adjustment knob 927 may be tightened so that the depth adjustment knob 927 engages the shaft 908A extending within the opening within the shaft 908C, which may eventually constrain the shaft 908A and fix the position of the shaft 908A relative to the shaft 908C. Alternatively, the depth adjustment knob 927 may be loosened so that the depth adjustment knob 927 does not engage the shaft 908A to the point that the depth adjustment knob 927 restricts movement of the shaft 908A relative to the shaft 908C. In this unlocked state, the position of the shaft 908A may be adjusted relative to the shaft 908C. While the depth adjustment knob 927 is used to adjust the depth of the propulsion motor 908 and the position of the shaft 908A, the depth adjustment knob 927 may be used to adjust the depth of the sonar transducer assembly 902 in other embodiments. The propulsion motor 908 is a trolling motor, but the propulsion motor 908 may be some other type of propulsion motor in other embodiments.

The combined assembly 925 of FIG. 9 comprises a motor 962 configured to remotely control the orientation of the shaft 908B. However, in some embodiments, the motor 962 may be configured to remotely control the position of the shaft 908B along the axis A8 relative to the other shafts 908A, 908C. One or more cables 934 may connect the motor 962 to other components at the shaft 908B. A series of cam shafts or gears may be employed to cause rotation of the shaft 908B. In one embodiment, a cable of the cable(s) 934 may rotate about the axis A8 and may act as a speedometer. However, a speedometer may be implemented in other ways in other embodiments.

Figure 10:
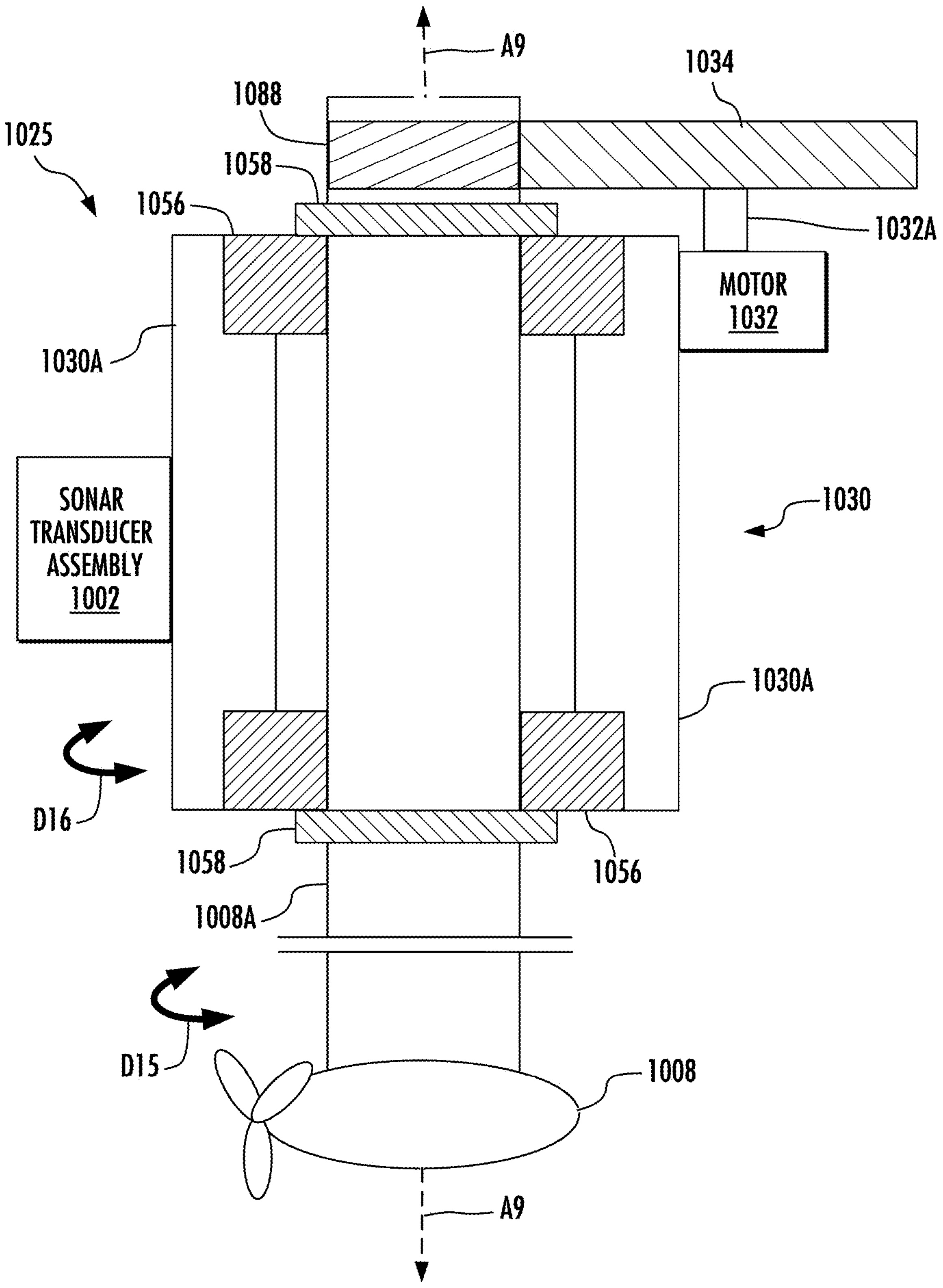
FIG. 10 is a schematic view illustrating an example combined assembly having a sonar transducer assembly and a propulsion motor, with the combined assembly being configured to enable rotation of the sonar transducer assembly and the propulsion motor relative to each other through the use of a gear that engages with a shaft, in accordance with some embodiments discussed herein.

An example combined assembly 1025 having a sonar transducer assembly 1002 and a motor 1032 are illustrated in the schematic view of FIG. 10, with this combined assembly 1025 being configured to enable rotation of the sonar transducer assembly 1002 and the motor 1032 relative to each other.

The combined assembly 1025 includes a subassembly 1030. The subassembly 1030 includes a member 1030A. This member 1030A may wrap 360 degrees around shaft 1008A relative to the axis A9. The subassembly 1030 also includes roller bearings 1056 attached to the member 1030A, and the roller bearings 1056 may be tapered roller bearings in some embodiments. Like the member 1030A, the roller bearings 1056 may wrap 360 degrees around the shaft 1008A relative to the axis A9. The sonar transducer assembly 1002 may be attached to the member 1030A. Additionally, the subassembly 1030 also includes two sleeves 1058. The sleeves 1058 define openings therein that are configured to receive the shaft 1008A therein. The sleeves 1058 may be configured to restrict movement of the subassembly 1030 in directions parallel to the axis A9. In some embodiments, the sleeves 1058 may be attached to the shaft 1008A so that the sleeves 1058 are not allowed to move in directions parallel to the axis A9 relative to the shaft 1008A.

The propulsion motor 1008 may be rotated relative to the subassembly 1030 and the sonar transducer assembly 1002 as indicated by the arrows D15, and the subassembly 1030 and the sonar transducer assembly 1002 may be rotated relative to the propulsion motor 1008 as indicated by the arrows D16. The combined assembly 1025 includes a shaft 1008A, a propulsion motor 1008, and a subassembly 1030 including a sonar transducer assembly 1002. Similar to other embodiments, the shaft 1008A may define an axis A9, and the propulsion motor 1008 is positioned at the end of the shaft 1008A. The propulsion motor 1008 is a trolling motor, but the propulsion motor 1008 may be some other type of propulsion motor in other embodiments.

The sonar transducer assembly 1002 is attached to the member 1030A within the subassembly 1030. Additionally, a motor 1032, a motor shaft 1032A, and a gear 1034 are provided in the combined assembly 1025, with each of these included as part of the subassembly 1030. The motor 1032 may be attached directly or indirectly to the member 1030A.

The motor shaft 1032A includes a first end and a second end. A first end of the motor shaft 1032A is attached to the motor 1032, and a second end of the motor shaft 1032A is attached to or is configured to engage with the gear 1034. The gear 1034 engages with the shaft 1008A at the area 1088 of the shaft 1008A. The area 1088 may have teeth that are configured to engage with the gear 1034, but the area 1088 may have grip tape or some other features to assist with engagement with the gear 1034 in other embodiments. Activation of the motor 1032 may cause rotation of the motor shaft 1032A, which may cause rotation of the gear 1034, which may cause rotation of the shaft 1008A, which may cause rotation of the subassembly 1030 relative to the shaft 1008A. The gear 1034 rotates about an axis that extends parallel relative to the axis A9.

Figure 11:
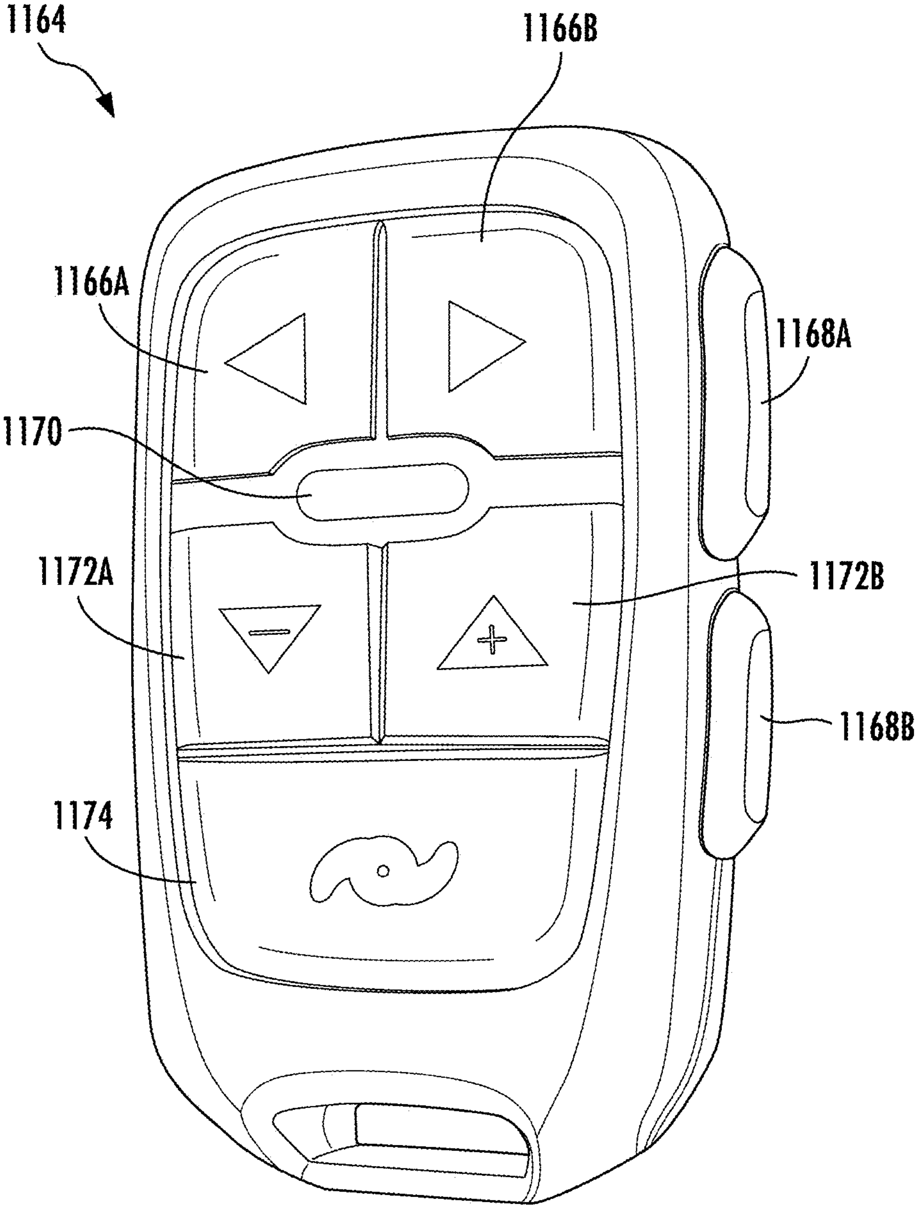
FIG. 11 is a perspective view illustrating an example remote configured to control the operation of the combined assemblies described herein, in accordance with some embodiments discussed herein.

FIG. 11 is a perspective view illustrating an example remote 1164 configured to control the operation of the combined assemblies described herein. The remote 1164 includes a button 1166A that may be selected to cause rotation of a component in a first direction (e.g., counterclockwise). The remote 1164 includes a button 1166B that may be selected to cause rotation of a component in a second direction (e.g., clockwise). The remote 1164 also includes buttons 1172A, 1172B. The button 1172A may be selected to cause a component to be lowered so that the depth of the component is increased, and the button 1172B may be selected to cause a component to be elevated so that the depth of the component is reduced.

The remote 1164 may be configured to operate in at least a first mode and a second mode. In the first mode, the remote 1164 may be configured to cause movement of a sonar transducer assembly. The user may press the button 1168A to cause the remote 1164 to operate in the first mode so that the sonar transducer assembly may be moved. In the second mode, the remote 1164 may be configured to cause movement of a propulsion motor. The user may press the button 1168B to cause the remote 1164 to operate in the second mode so that the propulsion motor may be moved. In some embodiments, the remote 1164 may operate in another mode where movement is caused for both the propulsion motor and the sonar transducer assembly simultaneously. In some embodiments, the remote 1164 may be configured to cause movement of another component in a combined assembly or on a watercraft.

The remote 1164 also includes a light 1170. The light 1170 may be configured to indicate the mode that the remote 1164 is operating in. For example, the light 1170 may be illuminated in a first color (e.g., green) when the remote 1164 is operating in a first mode, the light 1170 may be illuminated in a second color (e.g., red) when the remote 1164 is operating in a second mode, and the light 1170 may be illuminated in another color if the remote 1164 is operating in another mode. Alternatively, the light 1170 may flash at different intervals or in different patterns depending on the mode. In some embodiments, the light 1170 may indicate the mode when the light 1170 is not illuminated. In some embodiments, the light 1170 may be configured to indicate that the remote 1164 is turned on or that the remote battery is low. Additionally or alternatively, in some embodiments, the buttons 1168A, 1168B may extend out in different amounts depending on the mode to indicate the mode that the remote is currently operating in.

The remote 1164 also includes a button 1174, and the button 1174 may be selected to cause the watercraft to anchor in position. When the button 1174 is selected, the propulsion motor may be rotated as needed to maintain the watercraft at approximately the same position. In doing so, the propulsion motor may generate a variable amount of thrust to cause the watercraft to maintain position despite the effects of wind, water current, and other forces.

Figure 12:
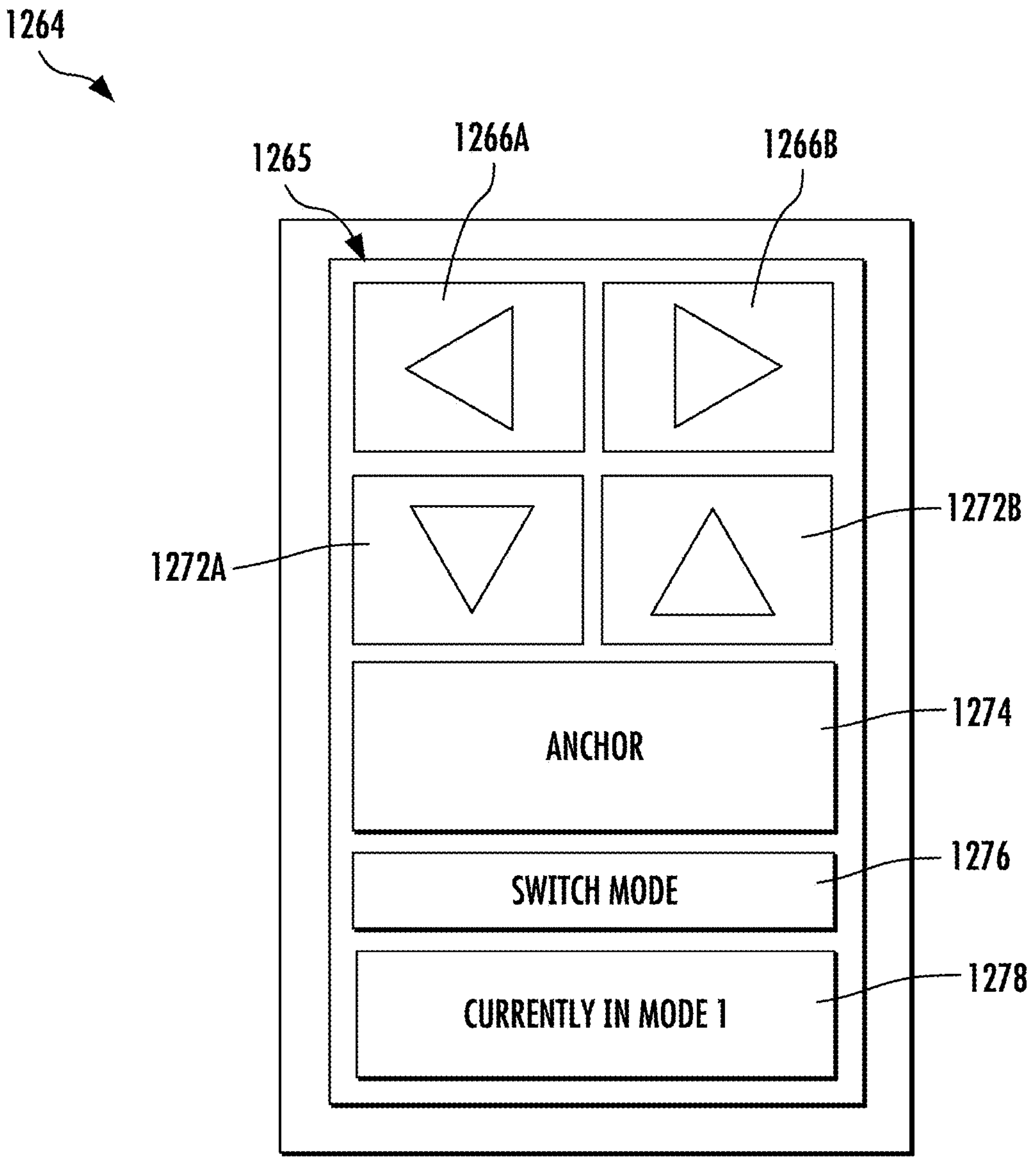
FIG. 12 is a schematic view illustrating an example remote configured to control the operation of the combined assemblies described herein, in accordance with some embodiments discussed herein.

Another example remote 1264 configured to control the operation of the combined assemblies described herein is illustrated in the schematic view of FIG. 12. The remote 1264 includes a screen 1265, which may be a touch screen configured to receive touch input from a user. Several different areas are illustrated on the screen 1265, with each of these areas effectively serving as buttons. A user provides a touch input in any of the areas to indicate their desired input. The area 1266A may be selected to cause rotation of a component in a first direction (e.g., counterclockwise), and the area 1266B may be selected to cause rotation of a component in a second direction (e.g., clockwise). The area 1272A may be selected to cause a component to be lowered so that the depth of the component is increased, and the area 1272B may be selected to cause a component to be elevated so that the depth of the component is decreased.

The area 1278 indicates that the remote 1264 is currently in a first mode. In this first mode, the remote 1264 may be configured to cause movement of a sonar transducer assembly. However, a user may select the area 1276 to switch the mode. In a second mode, the remote 1264 may be configured to cause movement of a propulsion motor. In some embodiments, the remote 1264 may operate in another mode where movement is caused for both the propulsion motor and the sonar transducer assembly simultaneously. In some embodiments, the remote 1264 may be configured to cause movement of another component in a combined assembly or on a watercraft.

The screen 1265 also includes the area 1274 that may be selected to cause the watercraft to anchor in position. When this is selected, the propulsion motor may be rotated as needed to maintain the watercraft at approximately the same position. In doing so, the propulsion motor may generate a variable amount of thrust to cause the watercraft to maintain position despite the effects of wind, water current, and other forces. However, the area 1274 may be omitted in some embodiments.

Figure 13:
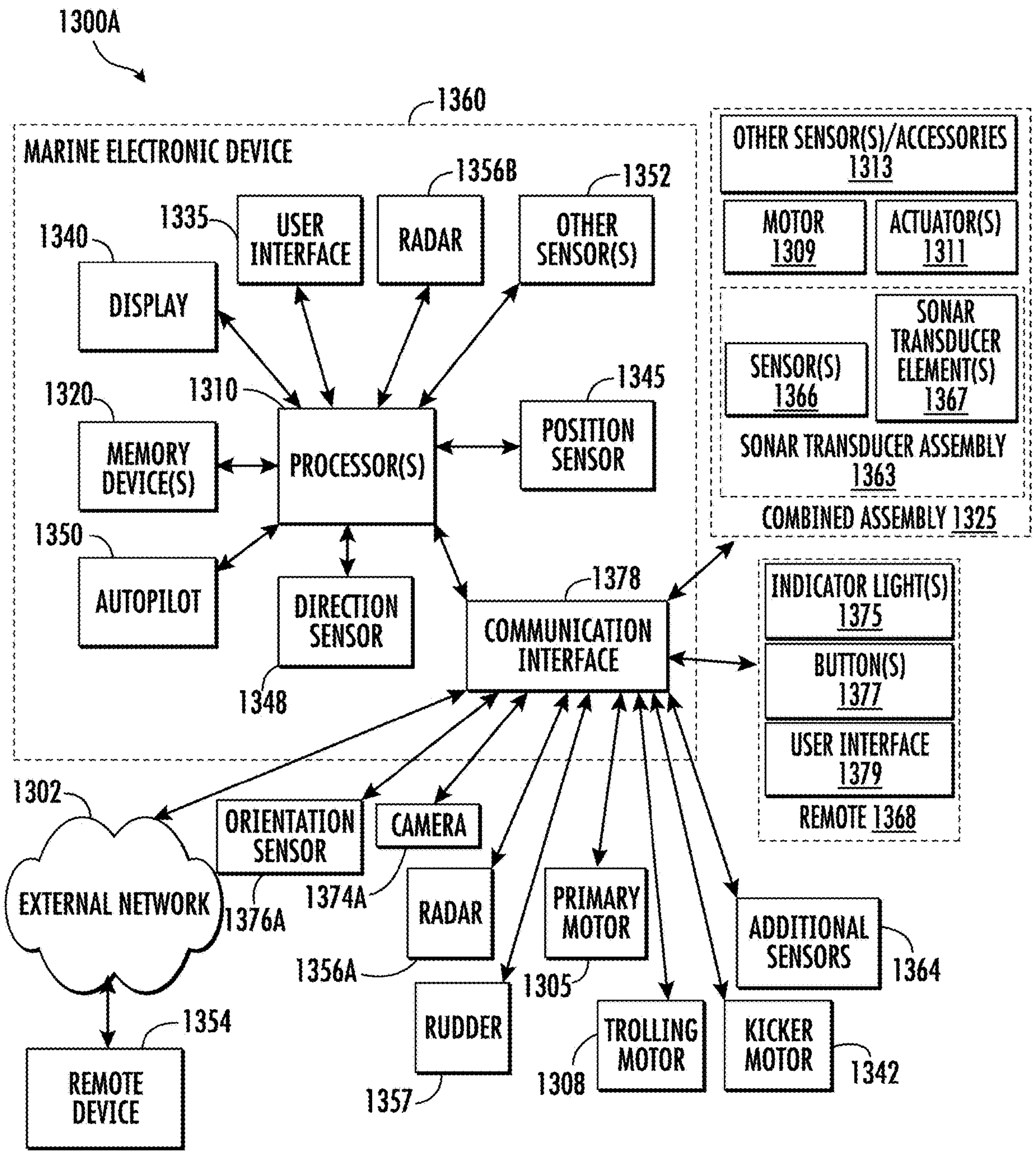
FIG. 13 is a block diagram illustrating example components within a system for controlling a combined assembly, in accordance with some embodiments discussed herein.

The watercraft and other assemblies described herein may comprise various electrical components, and FIG. 13 is a block diagram illustrating electrical components that may be provided in one example system 1300A. The system 1300A includes a combined assembly 1325. The combined assembly 1325 comprises a sonar transducer assembly 1363. However, one or more other sonar transducer assemblies may be positioned at other locations outside of the combined assembly 1325 in some embodiments.

The sonar transducer assembly 1363 illustrated in FIG. 13 may include one or more sonar transducer elements 1367, such as may be arranged to operate alone or in one or more transducer arrays. In some embodiments, additional separate sonar transducer elements (arranged to operate alone, in an array, or otherwise) may be included. The sonar transducer assembly 1363 may also include a sonar signal processor or another processor (although not shown) configured to perform various sonar processing. In some embodiments, the processor (e.g., processor(s) 1310 in the marine electronic device 1360, a controller (or processor portion) in the sonar transducer assembly 1363, or a remote controller—or combinations thereof) may be configured to filter sonar return data and/or selectively control sonar transducer element(s) 1367. For example, various processing devices (e.g., a multiplexer, a spectrum analyzer, A-to-D converter, etc.) may be utilized in controlling or filtering sonar return data and/or transmission of sonar signals from the sonar transducer element(s) 1367. Processor(s) may also be configured to filter data regarding certain objects out of map data.

The sonar transducer assembly 1363 may also include one or more other systems, such as various sensor(s) 1366. For example, the sonar transducer assembly 1363 may include an orientation sensor, such as gyroscope or other orientation sensor (e.g., accelerometer, MEMS, etc.) that may be configured to determine the relative orientation of the sonar transducer assembly 1363 and/or the one or more sonar transducer element(s) 1367—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like. While only one sonar transducer assembly 1363 is illustrated in FIG. 13, additional sonar transducer assemblies may be provided in other embodiments.

The combined assembly 1325 of the system 1300A also includes a propulsion motor 1309 and one or more actuators 1311. The propulsion motor 1309 may be a trolling motor, a primary motor, a kicker motor, or some other type of propulsion motor. The actuator(s) 1311 may be configured to generate movement of the shafts that the propulsion motor 1309 and the sonar transducer assembly 1363 are attached to. For example, the actuator(s) 1311 may be configured to cause rotation of a shaft associated with the propulsion motor 1309, rotation of a shaft associated with the sonar transducer assembly 1363, or rotation of both shafts so that both the propulsion motor 1309 and the sonar transducer assembly 1363 rotate. Additionally or alternatively, the actuator(s) 1311 may be configured to cause linear movement of one or more of the shafts to change the vertical position of the propulsion motor 1309 or the sonar transducer assembly 1363 relative to the remainder of the watercraft.

The system 1300A may also include a remote 1368. The remote 1368 may include one or more indicator light(s) 1375, one or more button(s) 1377, and a user interface 1379. The indicator light(s) 1375 may be configured to indicate the status of the remote 1368 and/or the system 1300A. For example, when the remote 1368 is in a first mode configured to generate movement of the sonar transducer assembly 1363, the indicator light(s) 1375 may be presented in a first manner, and when the remote 1368 is in a second mode configured to generate movement of the propulsion motor 1309, the indicator light(s) 1375 may be presented in a second manner different from the first manner. The indicator light(s) 1375 may be presented in different colors in some embodiments (e.g., white, red, blue, green, etc.). In some embodiments, the indicator light(s) 1375 may be turned on to indicate that the remote 1368 is in a first mode, and the indicator light(s) 1375 may be turned off to indicate that the remote 1368 is in a second mode. In some embodiments, the indicator light(s) 1375 may flash at certain intervals or in certain sequences to provide information about the state of the system 1300A and/or the remote 1368. In addition to indicating the mode that is being operated in, the indicator light(s) 1375 may be configured to indicate the battery level of one or more components within the system 1300A, to provide a warning indication (e.g., that a component is installed inappropriately, that a component is malfunctioning, etc.), or to convey other information.

The button(s) 1377 may be configured to receive an input from a user to change the state of the combined assembly 1325. For example, a button may be pressed to cause rotation of the sonar transducer assembly 1363 or the propulsion motor 1309 in a first rotational direction, a button may be pressed to cause rotation of the sonar transducer assembly 1363 or the propulsion motor 1309 in a second rotational direction, a button may be pressed to cause vertical movement of the sonar transducer assembly 1363 or the propulsion motor 1309 in a first direction, and/or a button may be pressed to cause vertical movement of the sonar transducer assembly 1363 or the propulsion motor 1309 in a second direction opposite the first direction. Additionally, in some embodiments, a button may be pressed to enable the remote 1368 to switch modes. For example, selection of the button may cause the remote 1368 to shift to a mode where inputs adjust the positioning or orientation of the propulsion motor 1309, or selection of the button may cause the remote 1368 to shift to a mode where inputs adjust the positioning or orientation of the sonar transducer element(s) 1367.

The user interface 1379 may include one or more input buttons, a speaker, a microphone, a keypad, and other mechanisms to enable the user to input commands. However, in some embodiments, a user interface 1379 may be provided simply in the form of a touch-screen display on the remote 1368. Where the user interface 1379 includes a display, one or more indicator areas may be presented on the screen rather than having indicator light(s) 1375. Additionally, where the user interface 1379 is provided in the form of a touch-screen display, the button(s) 1377 may be provided in the form of selectable areas on the user interface 1379.

In some embodiments, the combined assembly 1325 may include other sensor(s)/accessories 1313, which may include one or more orientation sensors. The orientation sensor(s) may be configured to determine the orientation of the propulsion motor 1309 or an orientation of the sonar transducer assembly 1363. Other accessories that may be provided may include Wi-Fi antennas that may be of a higher quality, radio technology such as ultra-wideband (UWB) radio technology, global positioning systems (GPS), etc.

In some embodiments, the sonar transducer assembly 1363, the propulsion motor 1309, the actuator(s) 1311, and other components within the combined assembly 1325 may be driven by the marine electronic device 1360 or one or more processors 1310 within the marine electronic device 1360. However, the sonar transducer assembly 1363 and the propulsion motor 1309 may be driven by their own processor(s) and memory device(s).

The system 1300A may comprise numerous marine devices. As shown in FIG. 13, a radar 1356A, a rudder 1357, a primary motor 1305, a trolling motor 1308, a kicker motor 1342, and additional sensors/devices 1364 may be provided as marine devices, but other marine devices may also be provided. Additionally, an orientation sensor 1376A and a camera 1374A may be provided as marine devices. The orientation sensor 1376A and the camera 1374A may be provided remote from the marine electronic device 1360, but these devices may be provided at the marine electronic device 1360 in other embodiments. One or more marine devices may be implemented on the marine electronic device 1360 as well. For example, a position sensor 1345, a direction sensor 1348, an autopilot 1350, and other sensors/devices 1352 may be provided within the marine electronic device 1360. These marine devices may be integrated within the marine electronic device 1360, integrated on a watercraft at another location and connected to the marine electronic device 1360, and/or the marine devices may be implemented at a remote device 1354 in some embodiments. The system 1300A may include any number of different systems, modules, units, or components, each of which may comprise any device or means embodied in either hardware, software, or a combination of hardware and software configured to perform one or more corresponding functions described herein.

The marine electronic device 1360 may include processor(s) 1310, memory device(s) 1320, a communications interface 1378, a user interface 1335, a display 1340, an autopilot 1350, and one or more sensors (e.g. position sensor 1345, direction sensor 1348, other sensors/devices 1352). One or more of the components of the marine electronic device 1360 may be located within a housing or may be separated into multiple different housings (e.g., be remotely located).

The processor(s) 1310 and any other processors described herein may be any means configured to execute various programmed operations or instructions stored in memory device(s) (e.g., memory device(s) 1320) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor(s) as described herein.

In an example embodiment, the memory device(s) 1320 and any other memory devices described herein may include one or more non-transitory storage or memory devices such as, for example, volatile and/or non-volatile memory that may be either fixed or removable. The memory device(s) 1320 and other memory devices may be configured to store instructions, computer program code, radar data, and additional data such as sonar data, chart data, location/position data in a non-transitory computer readable medium for use, such as by the processor(s) 1310 for enabling the marine electronic device 1360, the remote 1368, or another device to carry out various functions in accordance with example embodiments of the present invention. For example, the memory device(s) 1320 and other memory devices may be configured to buffer input data for processing by the processor(s) 1310. Additionally or alternatively, the memory device(s) 1320 and other memory devices may be configured to store instructions for execution by the processor(s) 1310. The memory device(s) 1320 and other memory devices may include computer program code that is configured to, when executed, cause the processor(s) 1310 to perform various methods described herein. The memory device(s) 1320 and other memory devices may serve as a non-transitory computer readable medium having stored thereon software instructions that, when executed by a processor, cause methods described herein to be performed.

The communications interface 1378 may be configured to enable communication to external systems (e.g. an external network 1302). In this manner, the marine electronic device 1360 may retrieve stored data from a remote device 1354 via the external network 1302 in addition to or as an alternative to the onboard memory device(s) 1320. Additionally or alternatively, the marine electronic device 1360 may transmit or receive data, such as radar signal data, radar return data, radar image data, path data or the like to or from a sonar transducer assembly 1363. In some embodiments, the marine electronic device 1360 may also be configured to communicate with other devices or systems (such as through the external network 1302 or through other communication networks, such as described herein). For example, the marine electronic device 1360 may communicate with a propulsion system of the watercraft 100 (e.g., for autopilot control); a remote device (e.g., a user's mobile device, a handheld remote, etc.); or another system.

The communications interface 1378 of the marine electronic device 1360 may also include one or more communications modules configured to communicate with one another in any of a number of different manners including, for example, via a network. In this regard, the communications interface 1378 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 1300A. In some embodiments, the remote 1368 may have a communications interface similar to communications interface 1378.

The position sensor 1345 may be configured to determine the current position and/or location of the marine electronic device 1360 (and/or the watercraft 100). For example, the position sensor 1345 may comprise a GPS, bottom contour, inertial navigation system, such as machined electromagnetic sensor (MEMS), a ring laser gyroscope, or other location detection system. Alternatively or in addition to determining the location of the marine electronic device 1360 or the watercraft 100, the position sensor 1345 may also be configured to determine the position and/or orientation of an object outside of the watercraft 100. In some embodiments, the remote 1368 may have similar a position sensor similar to position sensor 1345.

The display 1340 (e.g. one or more screens) and any other displays (e.g., a display associated with user interface 1379) may be configured to present images and may include or otherwise be in communication with user interfaces 1335, 1379 configured to receive input from a user. The displays may be, for example, a conventional LCD (liquid crystal display), a touch screen display, mobile device, or any other suitable display known in the art upon which images may be displayed.

In some embodiments, the displays may present one or more sets of data (or images generated from the one or more sets of data). Such data includes chart data, radar data, sonar data, weather data, location data, position data, orientation data, sonar data, or any other type of information relevant to the watercraft. Radar data may be received from radar 1356A located outside of a marine electronic device 1360, radar 1356B located in a marine electronic device 1360, or from radar devices positioned at other locations, such as remote from the watercraft. Additional data may be received from marine devices such as a sonar transducer assembly 1363 or an associated sensor, a primary motor 1305 or an associated sensor, a trolling motor 1308 or an associated sensor, a propulsion motor 1309 in the combined assembly 1325 or an associated sensor, an autopilot 1350, a rudder 1357 or an associated sensor, a position sensor 1345, a direction sensor 1348, other sensors/devices 1352, a remote device 1354, onboard memory device(s) 1320 (e.g., stored chart data, historical data, etc.), or other devices. Additional data may instead be received from a processor or memory device associated with these components.

The user interfaces 1335, 1379 may include, for example, a keyboard, keypad, function keys, buttons, a mouse, a scrolling device, input/output ports, a touch screen, or any other mechanism by which a user may interface with the system.

Although the display 1340 of FIG. 13 is shown as being directly connected to the processor(s) 1310 and within the marine electronic device 1360, the display 1340 could alternatively be remote from the processor(s) 1310 and/or marine electronic device 1360. Likewise, in some embodiments, the position sensor 1345 and/or user interface 1335 may be remote from the marine electronic device 1360.

The marine electronic device 1360 and the combined assembly 1325 may include one or more other sensors/devices 1352 and other sensor(s)/accessories 1313, such as configured to measure or sense various other conditions. The other sensors/devices 1352 and other sensor(s)/accessories 1313 may include, for example, an air temperature sensor, a water temperature sensor, a current sensor, a light sensor, a wind sensor, a speed sensor, or the like.

The components presented in FIG. 13 may be rearranged to alter the connections between components. For example, in some embodiments, a marine device outside of the marine electronic device 1360, such as the radar 1356A, may be directly connected to the processor(s) 1310 rather than being connected to the communications interface 1378. Additionally, sensors and devices implemented within the marine electronic device 1360 may be directly connected to the communications interface 1378 in some embodiments rather than being directly connected to the processor(s) 1310.

Figure 14:
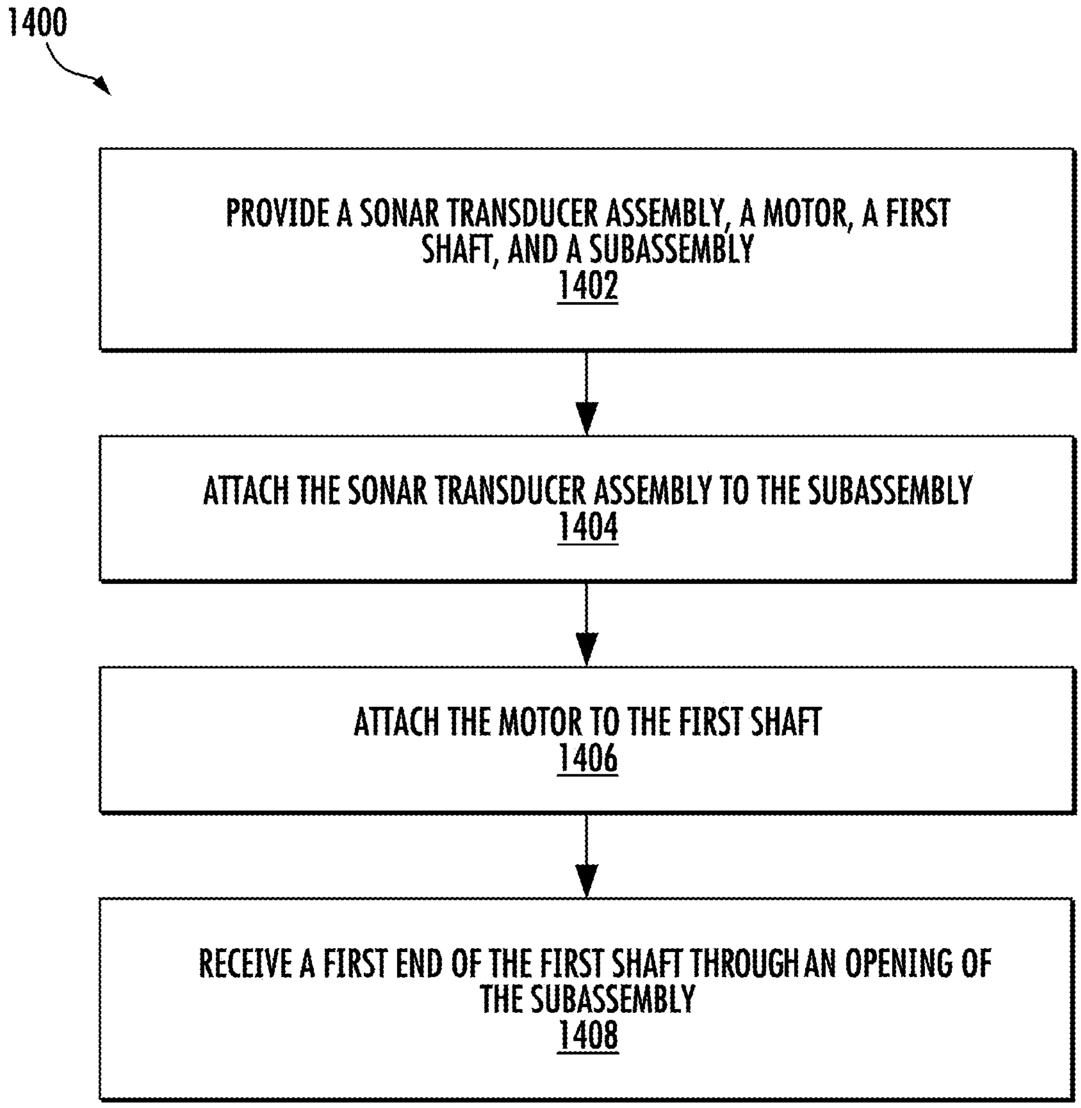
FIG. 14 is a flow chart illustrating an example method for assembling a combined sonar and motor assembly for use on a watercraft, in accordance with some embodiments discussed herein.

An example method for assembling a combined sonar and motor assembly for use on a watercraft is illustrated in the flow chart of FIG. 14. At operation 1402, a sonar transducer assembly, a propulsion motor, a first shaft, and a subassembly are provided. The first shaft defines an axis, and the first shaft also defines a first end and a second end. The subassembly defines an opening therein. The subassembly may include a second shaft that is hollow and that defines the opening of the subassembly therein.

At operation 1404, the sonar transducer assembly is attached to the subassembly.

At operation 1406, the propulsion motor is attached to the first shaft. The propulsion motor may be attached to the first shaft proximate to the second end of the first shaft.

At operation 1408, the first end of the first shaft may be received within the opening of the subassembly. The first end of the first shaft may be received within the opening so that the first shaft is allowed to rotate about an axis and so that the sonar transducer assembly is rotatable about the axis relative to the propulsion motor. In some embodiments, the first end of the first shaft may be received in the opening so that the first shaft is allowed to move along the axis relative to the subassembly and so that the distance between the sonar transducer assembly and the propulsion motor is adjustable.

The method 1400 of FIG. 14 is merely exemplary, and the method 1400 may be modified in various ways. For example, certain operations of the method 1400 may be omitted, and certain operations may be added to the method 1400. Additionally, certain operations within the method 1400 may be performed in different orders, and some of the operations may be performed simultaneously in some embodiments.

CONCLUSION

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A combined sonar and motor assembly comprising:

a sonar transducer assembly;

a propulsion motor;

a subassembly defining an opening therein, the subassembly comprising a member, a first sleeve attached to the member, and a second sleeve attached to the member, the first sleeve and the second sleeve each defining a circular opening configured to receive a first shaft therethrough;

a first shaft defining an axis, the propulsion motor being attached to a first end of the first shaft; and a gear motor attached to the member and configured to rotate about the axis with the subassembly, wherein the sonar transducer assembly is attached to the subassembly and is separated from the axis by a lateral distance, wherein the propulsion motor is attached to the first shaft, and wherein the subassembly is configured to receive the first shaft within the opening so that the first shaft is rotatable relative to the subassembly to enable rotation of the sonar transducer assembly about the axis relative to the propulsion motor, and wherein the gear motor drives a first gear via a motor shaft, the first gear rotatable about a first gear axis extending perpendicularly to the axis, the first gear engaging a second gear engaging the first shaft, the second gear rotatable about a second gear axis extending parallel to the axis, and rotation of the first gear driving rotation of the subassembly relative to the first shaft.

2. The combined sonar and motor assembly of claim 1, wherein the subassembly includes a second shaft, wherein the second shaft is hollow and defines an opening, wherein the first shaft is received within the opening of the second shaft, wherein the first shaft is configured to rotate relative to the second shaft, wherein the sonar transducer assembly is attached on the second shaft, and wherein the first shaft and the second shaft are rotatable relative to each other to enable rotation of one of the sonar transducer assembly or the propulsion motor about the axis without rotating the other.

3. The combined sonar and motor assembly of claim 2, wherein the first shaft is configured to slide within the opening of the second shaft to increase or decrease a distance between the sonar transducer assembly and the propulsion motor.

4. The combined sonar and motor assembly of claim 3, further comprising: a depth adjustment knob configured to adjust a depth of at least one of the sonar transducer assembly or the propulsion motor.

5. The combined sonar and motor assembly of claim 1, wherein the propulsion motor is a trolling motor.

6. The combined sonar and motor assembly of claim 1, wherein the first sleeve and the second sleeve each include bearings therein configured to allow rotation of the first shaft relative to the subassembly.

7. The combined sonar and motor assembly of claim 1, wherein the second gear engages a toothed portion of the first shaft.

8. The combined sonar and motor assembly of claim 1, wherein the first sleeve comprises a first portion and a second portion attachable together using fasteners, and wherein the first shaft is received within openings defined by the first portion and the second portion of the first sleeve.

9. The combined sonar and motor assembly of claim 1, further comprising one or more cables connecting the subassembly to one or more external components to provide at least one of power or data to the subassembly.

10. The combined sonar and motor assembly of claim 1, wherein the sonar transducer assembly is separated from the axis by a lateral distance of between about 2 centimeters and about 50 centimeters.

11. The combined sonar and motor assembly of claim 1, wherein an orientation of at least one of the sonar transducer assembly or the propulsion motor is manually adjustable.

12. A combined sonar and motor assembly comprising:

a sonar transducer assembly;

a propulsion motor;

a first shaft defining an axis;

a gear motor; and a second shaft that is hollow and that defines an opening, wherein the first shaft is received within the opening of the second shaft, wherein the propulsion motor is attached on the first shaft, wherein the sonar transducer assembly is attached on the second shaft, and wherein the second shaft is configured to rotate relative to the first shaft about the axis to enable a rotation of the sonar transducer assembly about the axis relative to the propulsion motor, and wherein the gear motor drives a first gear via a motor shaft, the first gear rotatable about a first gear axis extending perpendicularly to the axis, the first gear engaging a second gear engaging the first shaft, the second gear rotatable about a second gear axis extending parallel to the axis, and rotation of the first gear driving rotation of the second shaft relative to the first shaft.

13. The combined sonar and motor assembly of claim 12, wherein the second shaft is configured to be attached to a body of the watercraft, and wherein the first shaft is not directly attached to the body of the watercraft.

14. The combined sonar and motor assembly of claim 12, wherein the first shaft is received within the opening of the second shaft, and wherein the first shaft is configured to rotate relative to the second shaft.

15. The combined sonar and motor assembly of claim 14, wherein the first shaft is configured to slide within the opening of the second shaft to increase or decrease a distance between the sonar transducer assembly and the propulsion motor.

16. A method of assembling a combined sonar and motor assembly for a watercraft, the method comprising:

providing a first shaft that defines an axis, wherein the first shaft defines a first end and a second end;

providing a gear motor, a sonar transducer assembly, a propulsion motor, and a subassembly, wherein the subassembly defines an opening therein;

attaching the sonar transducer assembly to the subassembly;

attaching the propulsion motor to the first shaft proximate to the second end of the first shaft; and coupling the gear motor to the subassembly such that the gear motor drives a first gear via a motor shaft, the first gear rotatable about a first gear axis extending perpendicularly to the axis and engaging a second gear, the second gear rotatable about a second gear axis extending parallel to the axis and engaging the first shaft; and receiving the first end of the first shaft through the opening of the subassembly, wherein the first end of the first shaft is received through the opening of the subassembly so that the first shaft is allowed to rotate about the axis and so that rotation of the first gear drives rotation of the subassembly relative to the first shaft, enabling rotation of the sonar transducer assembly about the axis relative to the propulsion motor.

17. The method of claim 16, wherein the first end of the first shaft is received in the opening of the subassembly so that the first shaft is allowed to move along the axis relative to the subassembly and so that the distance between the sonar transducer assembly and the propulsion motor is adjustable.

* * * * *